(12) United States Patent
Prevost et al.

(10) Patent No.: US 11,655,850 B2
(45) Date of Patent: May 23, 2023

(54) CONTINUOUS DIAMOND SURFACE BEARINGS FOR SLIDING ENGAGEMENT WITH METAL SURFACES

(71) Applicants: Gregory Prevost, Spring, TX (US); Edward C. Spatz, Spring, TX (US)

(72) Inventors: Gregory Prevost, Spring, TX (US); Edward C. Spatz, Spring, TX (US)

(73) Assignee: Pi Tech Innovations LLC, Houston, TX (US)

( * ) Notice: Subject to any disclaimer, the term of this patent is extended or adjusted under 35 U.S.C. 154(b) by 0 days.

(21) Appl. No.: 17/522,335

(22) Filed: Nov. 9, 2021

(65) Prior Publication Data
US 2022/0145933 A1 May 12, 2022

Related U.S. Application Data

(60) Provisional application No. 63/111,145, filed on Nov. 9, 2020.

(51) Int. Cl.
*F16C 17/02* (2006.01)
*F16C 33/04* (2006.01)
(Continued)

(52) U.S. Cl.
CPC ............ *F16C 25/04* (2013.01); *F16C 33/043* (2013.01); *F16C 33/06* (2013.01); *F16C 17/02* (2013.01);
(Continued)

(58) Field of Classification Search
CPC ........ F16C 17/02; F16C 25/04; F16C 33/043; F16C 33/06; F16C 2206/04; F16C 2220/70; F16C 2240/54; F16C 2223/60
See application file for complete search history.

(56) References Cited

U.S. PATENT DOCUMENTS 2,693,396 A 11/1954 Gondek
2,947,609 A 8/1960 Strong
(Continued)

FOREIGN PATENT DOCUMENTS

DE 4226986 A1 2/1994
DE 29705983 U1 6/1997
(Continued)

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.
(Continued)

*Primary Examiner* — Phillip A Johnson
(74) *Attorney, Agent, or Firm* — Michael S. McCoy; Amatong McCoy LLC

(57) ABSTRACT

Bearings assemblies are provided that include polycrystalline diamond bearing surfaces that are engaged with opposing, metal bearing surfaces that include more than trace amounts of diamond solvent-catalyst. In the bearings, the opposing bearing surface is slidingly engaged with the polycrystalline diamond bearing surface along a diamond contact area of the polycrystalline diamond bearing surface, and the polycrystalline diamond bearing surface is a continuous surface along the diamond contact area. Also provided are methods of making and using the bearing assemblies.

32 Claims, 10 Drawing Sheets

(51) Int. Cl.
*F16C 25/04* (2006.01)
*F16C 33/06* (2006.01)

(52) U.S. Cl.
CPC ...... *F16C 2206/04* (2013.01); *F16C 2223/60* (2013.01); *F16C 2240/54* (2013.01)

(56) References Cited

U.S. PATENT DOCUMENTS

| | | |
|---|---|---|
| 2,947,610 A | 8/1960 | Hall et al. |
| 3,132,904 A | 5/1964 | Kohei et al. |
| 3,582,161 A | 6/1971 | Hudson |
| 3,603,652 A | 9/1971 | Youden |
| 3,650,714 A | 3/1972 | Farkas |
| 3,745,623 A | 7/1973 | Wentorf et al. |
| 3,752,541 A | 8/1973 | Mcvey |
| 3,866,987 A | 2/1975 | Gamer |
| 3,920,290 A | 11/1975 | Evarts |
| 4,085,634 A | 4/1978 | Sattler |
| 4,225,322 A | 9/1980 | Knemeyer |
| 4,275,935 A | 6/1981 | Thompson et al. |
| 4,285,550 A | 8/1981 | Blackbum et al. |
| 4,382,637 A | 5/1983 | Blackbum et al. |
| 4,410,054 A | 10/1983 | Nagel et al. |
| 4,410,284 A | 10/1983 | Herrick |
| 4,468,138 A | 8/1984 | Nagel |
| 4,525,178 A | 6/1985 | Hall |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,720,199 A | 1/1988 | Geczy et al. |
| 4,729,440 A | 3/1988 | Hall |
| 4,738,322 A | 4/1988 | Hall et al. |
| 4,764,036 A | 8/1988 | McPherson |
| 4,797,011 A | 1/1989 | Saeki et al. |
| 4,906,528 A | 3/1990 | Cerceau et al. |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,151,107 A | 9/1992 | Cho et al. |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,385,715 A | 1/1995 | Fish |
| 5,447,208 A | 9/1995 | Lund et al. |
| 5,462,362 A | 10/1995 | Yuhta et al. |
| 5,514,183 A | 5/1996 | Epstein et al. |
| 5,560,716 A | 10/1996 | Tank et al. |
| 5,645,617 A | 7/1997 | Frushour |
| 5,653,300 A | 8/1997 | Lund et al. |
| 5,855,996 A | 1/1999 | Corrigan et al. |
| 5,948,541 A | 9/1999 | Inspektor |
| 6,045,029 A | 4/2000 | Scott |
| 6,164,109 A | 12/2000 | Bartosch |
| 6,209,185 B1 | 4/2001 | Scott |
| 6,488,103 B1 | 12/2002 | Dennis et al. |
| 6,488,715 B1 | 12/2002 | Pope et al. |
| 6,517,583 B1 | 2/2003 | Pope et al. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,814,775 B2 | 11/2004 | Scurlock et al. |
| 6,951,578 B1 | 10/2005 | Belnap et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,080,071 B1 | 12/2011 | Vail |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,702,824 B1 | 4/2014 | Sani et al. |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,789,281 B1 * | 7/2014 | Sexton .................. F16C 33/043 29/898.041 |
| 8,881,849 B2 | 11/2014 | Shen et al. |
| 8,911,521 B1 | 12/2014 | Miess et al. |
| 8,939,652 B2 | 1/2015 | Peterson et al. |
| 8,974,559 B2 | 3/2015 | Frushour |
| 9,004,198 B2 | 4/2015 | Kulkarni |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,611,885 B1 | 4/2017 | Cooley et al. |
| 9,643,293 B1 | 5/2017 | Miess et al. |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,822,523 B1 | 11/2017 | Miess |
| 10,060,192 B1 | 8/2018 | Miess et al. |
| 10,113,362 B2 | 10/2018 | Ritchie et al. |
| 10,279,454 B2 | 5/2019 | DiGiovanni et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 | 11/2019 | Miess et al. |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B1 | 10/2020 | Hawks et al. |
| 10,968,700 B1 | 4/2021 | Raymond |
| 10,968,703 B2 | 4/2021 | Haugvaldstad et al. |
| 11,054,000 B2 | 7/2021 | Prevost et al. |
| 11,085,488 B2 | 8/2021 | Gonzalez |
| 2003/0019106 A1 | 1/2003 | Pope et al. |
| 2003/0075363 A1 | 4/2003 | Lin et al. |
| 2003/0220691 A1 | 11/2003 | Songer et al. |
| 2004/0031625 A1 | 2/2004 | Lin et al. |
| 2004/0134687 A1 | 7/2004 | Radford et al. |
| 2004/0219362 A1 | 11/2004 | Wort et al. |
| 2004/0223676 A1 | 11/2004 | Pope et al. |

(56) References Cited

U.S. PATENT DOCUMENTS

| | | |
|---|---|---|
| 2006/0060392 A1 | 3/2006 | Eyre |
| 2006/0165973 A1 | 7/2006 | Dumm et al. |
| 2007/0046119 A1 | 3/2007 | Cooley |
| 2008/0253706 A1 | 10/2008 | Bischof et al. |
| 2009/0087563 A1 | 4/2009 | Voegele et al. |
| 2009/0268995 A1 | 10/2009 | Ide et al. |
| 2010/0276200 A1 | 11/2010 | Schwefe et al. |
| 2010/0307069 A1 | 12/2010 | Bertagnolli et al. |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0004106 A1 | 1/2013 | Wenzel |
| 2013/0092454 A1 | 4/2013 | Scott et al. |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson |
| 2015/0132539 A1 | 5/2015 | Bailey et al. |
| 2016/0153243 A1 | 6/2016 | Hinz et al. |
| 2016/0312535 A1 | 10/2016 | Ritchie et al. |
| 2017/0138224 A1 | 5/2017 | Henry et al. |
| 2017/0234071 A1 | 8/2017 | Spalz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |
| 2019/0063495 A1 | 2/2019 | Peterson et al. |
| 2019/0136628 A1 | 5/2019 | Savage et al. |
| 2019/0170186 A1 | 6/2019 | Gonzalez et al. |
| 2020/0031586 A1 | 1/2020 | Miess et al. |
| 2020/0032846 A1 | 1/2020 | Miess et al. |
| 2020/0056659 A1 | 2/2020 | Prevost et al. |
| 2020/0063498 A1 | 2/2020 | Prevost et al. |
| 2020/0063503 A1 | 2/2020 | Reese et al. |
| 2020/0182290 A1 | 6/2020 | Doehring et al. |
| 2020/0325933 A1 | 10/2020 | Prevost et al. |
| 2020/0362956 A1 | 11/2020 | Prevost et al. |
| 2020/0378440 A1 | 12/2020 | Prevost et al. |
| 2021/0140277 A1 | 5/2021 | Hall et al. |
| 2021/0148406 A1 | 5/2021 | Hoyle et al. |
| 2021/0198949 A1 | 7/2021 | Haugvaldstad et al. |
| 2021/0207437 A1 | 7/2021 | Raymond |
| 2021/0222734 A1 | 7/2021 | Gonzalez et al. |

FOREIGN PATENT DOCUMENTS

| | | | | |
|---|---|---|---|---|
| JP | S6061404 A | 4/1985 | | |
| JP | 2004002912 A | 1/2004 | | |
| JP | 2008056735 A | 3/2008 | | |
| WO | 8700080 A1 | 1/1987 | | |
| WO | 2004001238 A2 | 12/2003 | | |
| WO | 2006011028 A1 | 2/2006 | | |
| WO | 2013043917 A1 | 3/2013 | | |
| WO | WO-2014014673 A1 * | 1/2014 | ............. | E21B 4/003 |
| WO | 2014189763 A1 | 11/2014 | | |
| WO | 2016089680 A1 | 6/2016 | | |
| WO | 2017105883 A1 | 6/2017 | | |
| WO | 2018041578 A1 | 3/2018 | | |
| WO | 2018226380 A1 | 12/2018 | | |
| WO | 2019096851 A1 | 5/2019 | | |

OTHER PUBLICATIONS

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.

International Search Report and Written Opinion dated Feb. 3, 2022 (issued in PCT Application No. PCT/US21/58584) [14 pages].

Liao, Y.; Marks, L.; In situ single asperity wear at the nanometre scale, International Materials Reviews, 2016, pp. 1-17, Taylor & Franc Linear Rolling Bearings ME EN 7960—Precision Machine Design Topic 8, Presentation, Accessed on Jan. 26, 2020, 23 pages, University of Utah.

Machinery's Handbook 30th Edition, Copyright Page and Coefficients of Friction Page, 2016, p. 158 (2 Pages total), Industrial Press, Inc., South Norwalk, U.S.A.

Machinery's Handbook, 2016, Industrial Press, Inc., 30th edition, pp. 843 and 1055 (6 pages total).

McCarthy, J. Michael; Cam and Follower Systems, PowerPoint Presentation, Jul. 25, 2009, pp. 1-14, UCIrvine The Henry Samueli School of Engineering.

McGill Cam Follower Bearings brochure, 2005, p. 1-19, Back Page, Brochure MCCF-05, Form #8991 (20 Pages total).

Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.

Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).

RBC Aerospace Bearings Rolling Element Bearings catalog, 2008, Cover Page, First Page, Pages 1-149, Back Page (152 Pages total).

RGPBalls Ball Transfer Units catalog, accessed on Jun. 23, 2018, pp. 1-26, 2 Back Pages (28 Pages total).

Sandvik Coromant Hard part turning with CBN catalog, 2012, pp. 1-42, 2 Back Pages (44 Pages total).

Sexton, Timothy N.; Cooley, Craig H.; Diamond Bearing Technology for Deep and Geothermal Drilling, PowerPoint Presentation, 2010, 16 Pages.

SKF Ball transfer units catalog, Dec. 2006, Cover Page, Table of Contents, pp. 1-36, 2 Back Pages (40 Pages total), Publication 940-711.

Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).

Sun, Liling; Wu, Qi; Dai, Daoyang; Zhang, Jun; Qin, Zhicheng; Wang, Wenkui; Non-metallic catalysts for diamond synthesis under

(56) References Cited

OTHER PUBLICATIONS high pressure and high temperature, Science in China (Series A), Aug. 1999, pp. 834-841, vol. 42 No. 8, China.

Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.

Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.

United States Defensive Publication No. T102,901, published Apr. 5, 1983, in U.S. Appl. No. 298,271 [2 Pages].

USSynthetic Bearings and Waukesha Bearings brochure for Diamond Tilting Pad Thrust Bearings, 2015, 2 Pages.

USSynthetic Bearings brochure, accessed on Jun. 23, 2018, 12 Pages, Orem, Utah.

Zeidan, Fouad Y.; Paquette, Donald J., Application of High Speed and High Performance Fluid Film Bearings in Rotating Machinery, 1994, pp. 209-234.

Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.

Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

Non-Final Office Action dated Jul. 21, 2022 (issued in U.S. Appl. No. 17/518,315) [7 pages].

Response to Non-Final Office Action dated Jul. 21, 2022 (issued in U.S. Appl. No. 17/518,315) [7 pages].

* cited by examiner

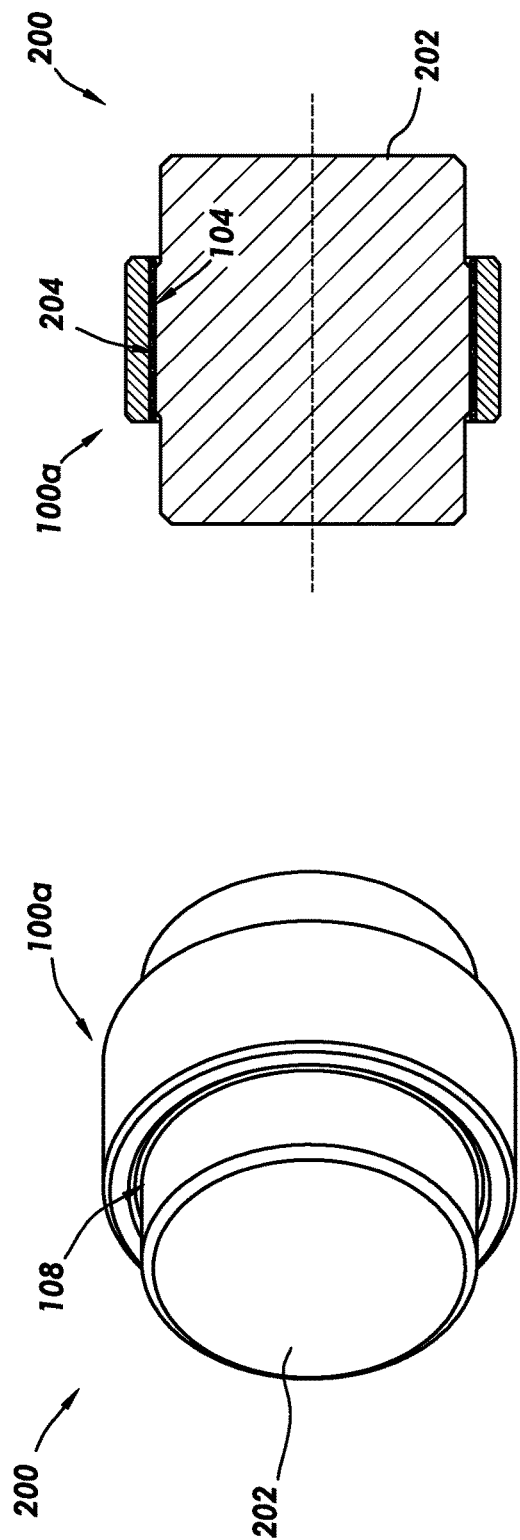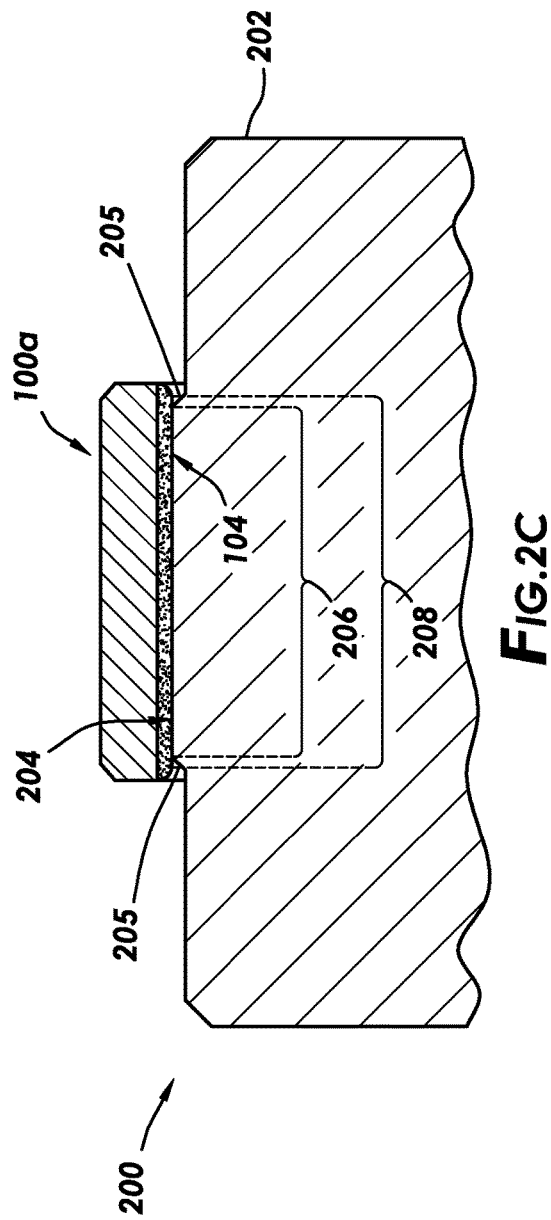

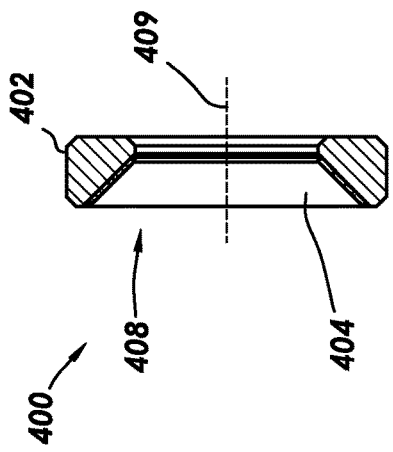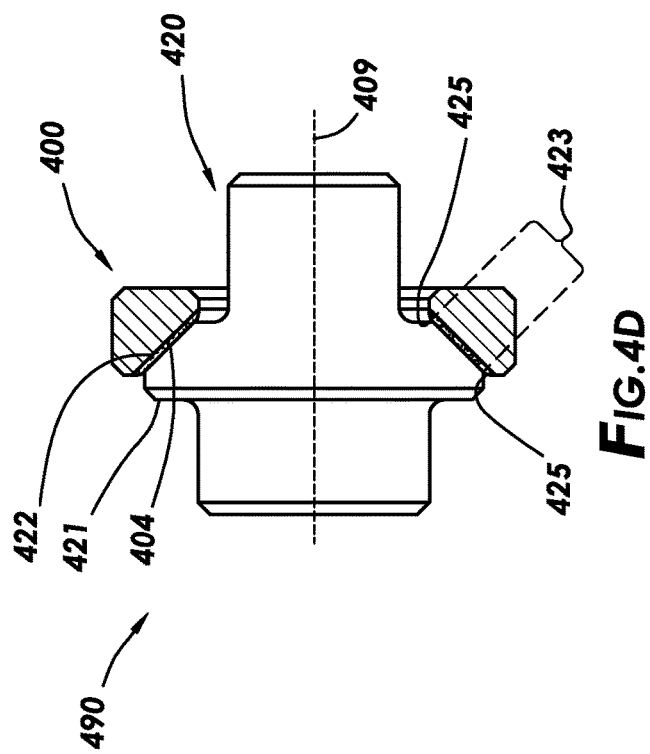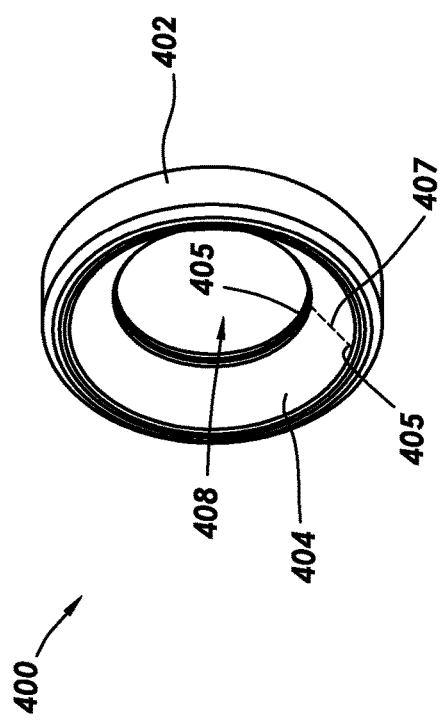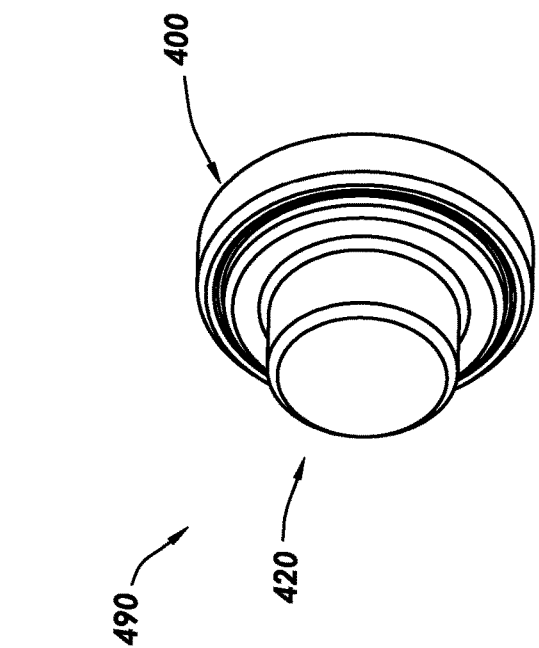

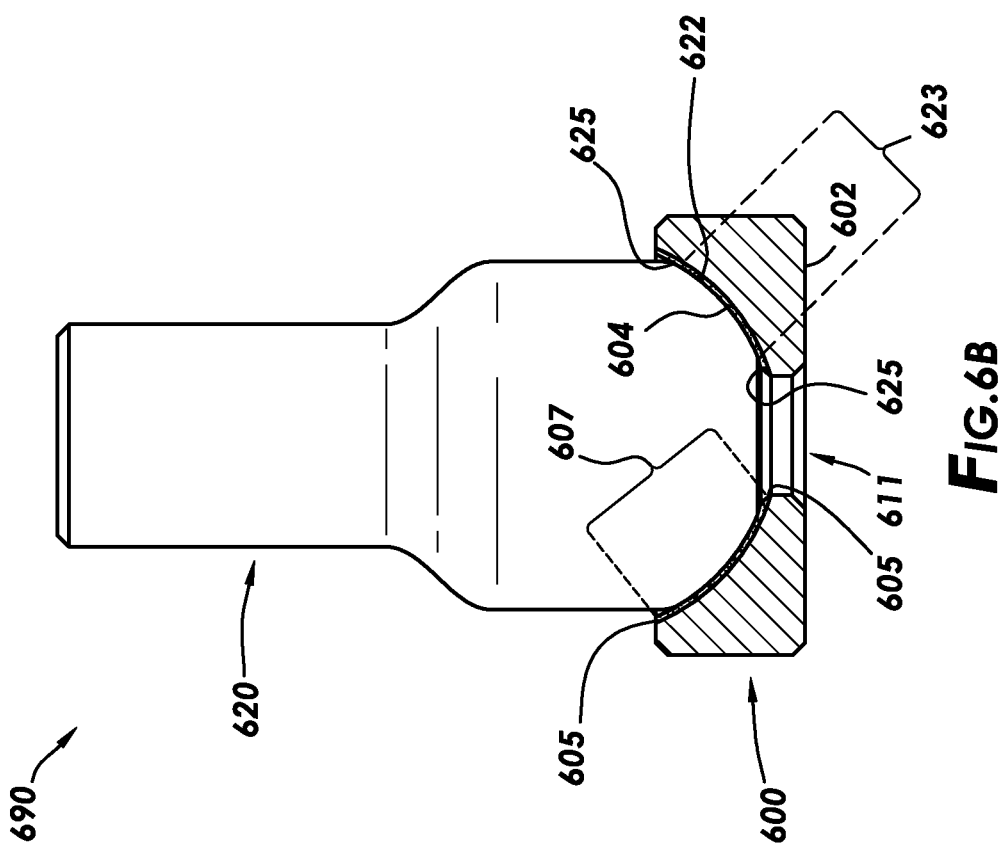
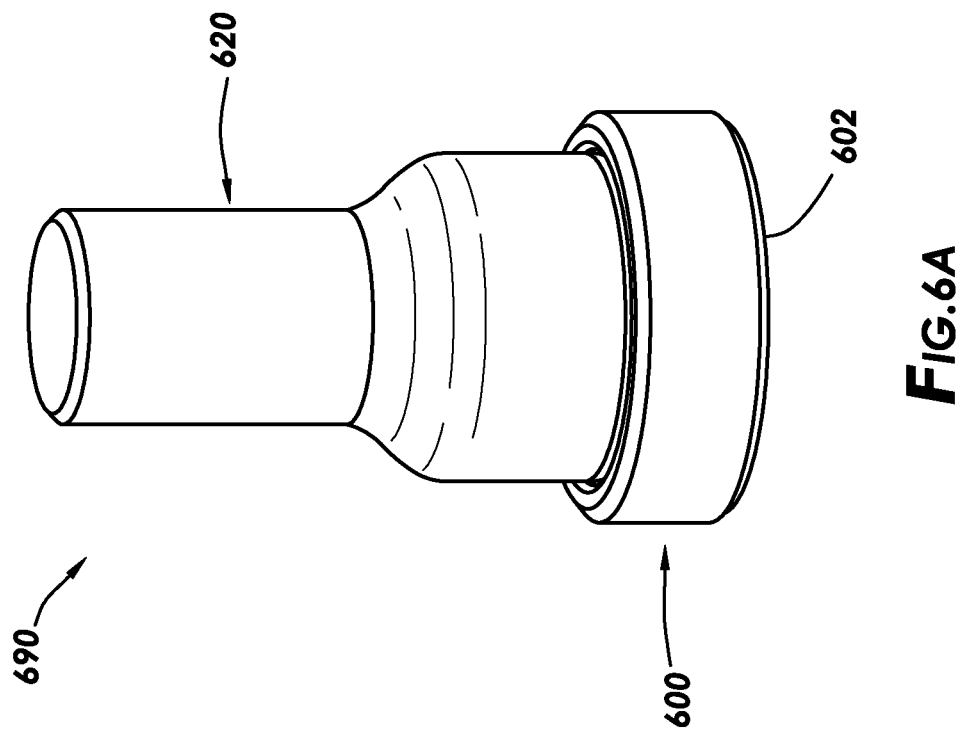

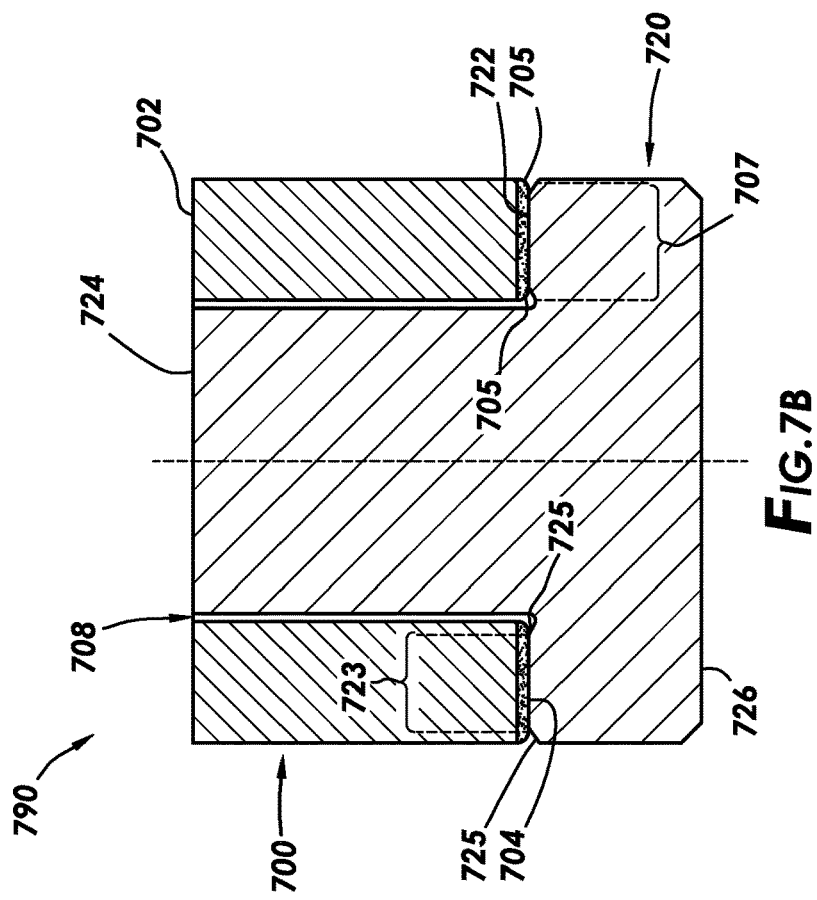
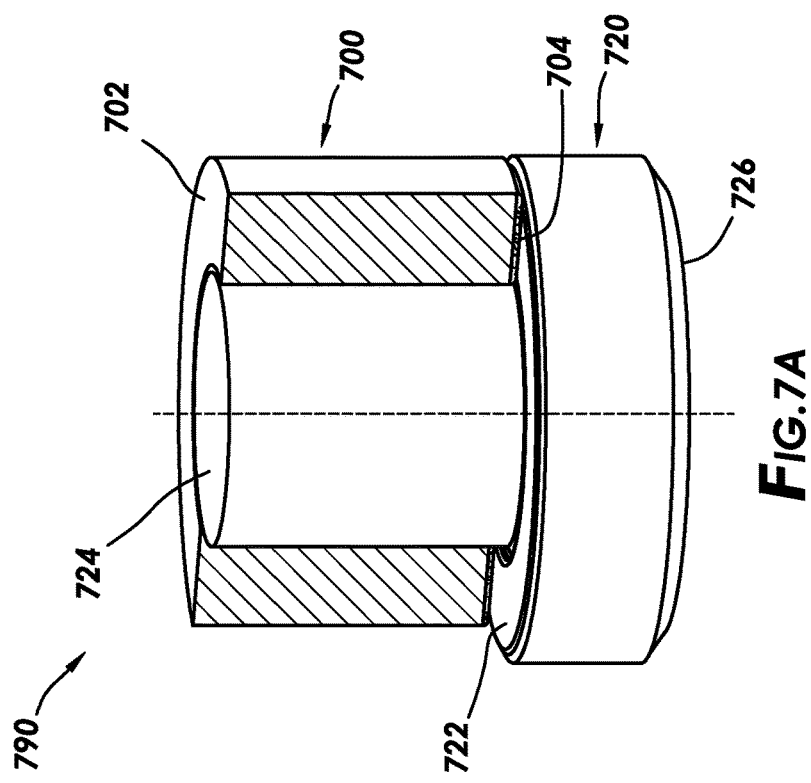

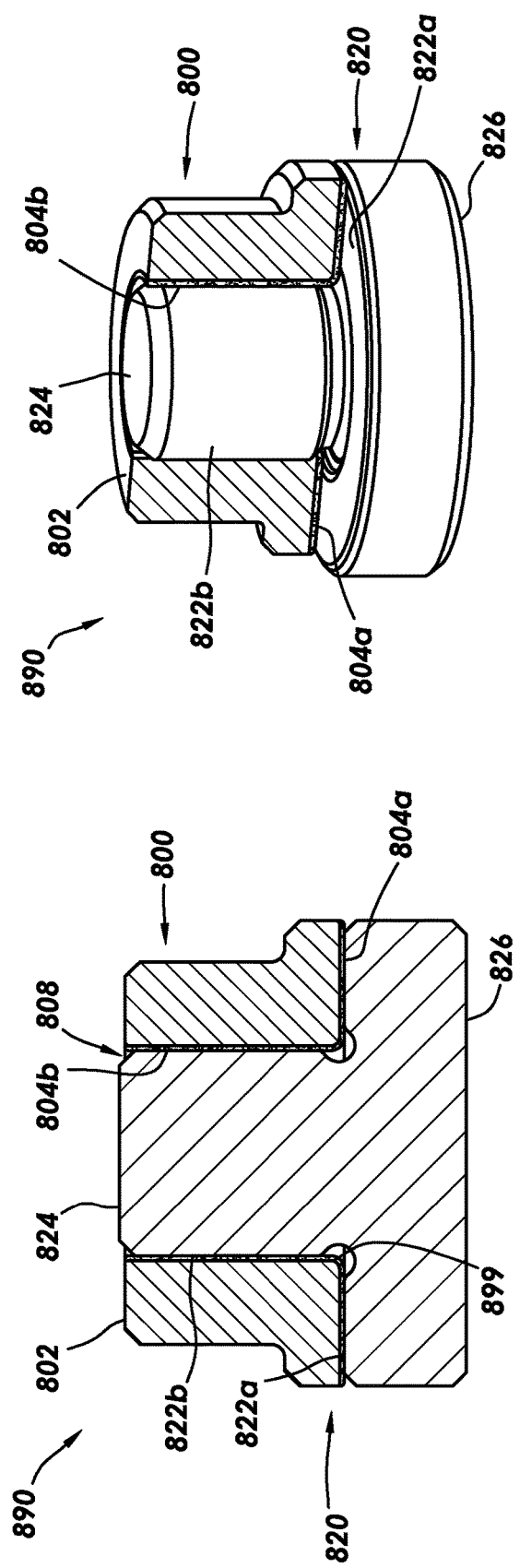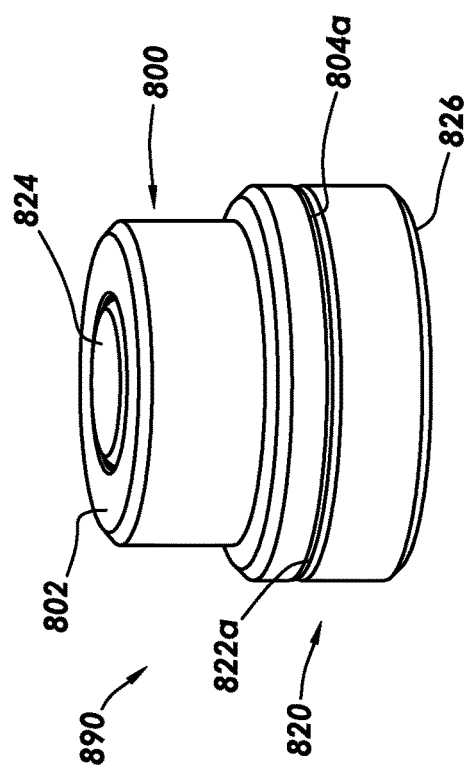

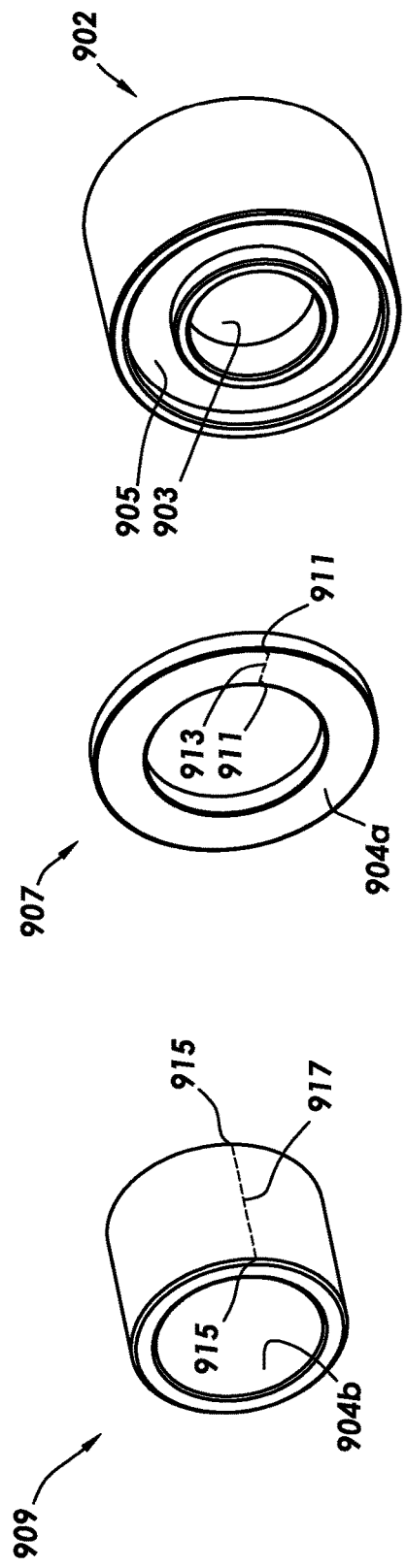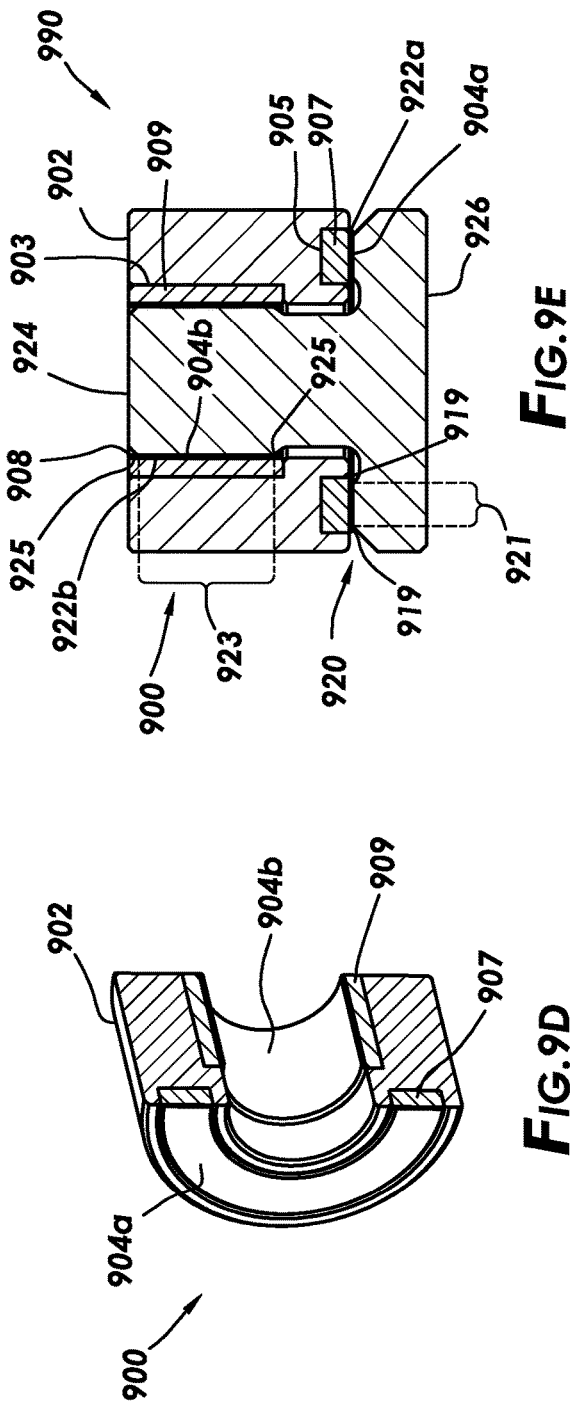

CONTINUOUS DIAMOND SURFACE BEARINGS FOR SLIDING ENGAGEMENT WITH METAL SURFACES

CROSS-REFERENCE TO RELATED APPLICATIONS

The present application claims the benefit of U.S. Provisional Patent Application No. 63/111,145, filed on Nov. 9, 2020, and entitled "Continuous Diamond Surface Bearings for Sliding Engagement with Metal Surfaces," the entirety of which is incorporated herein by reference.

FIELD

The present disclosure relates to bearings that include continuous diamond bearing surfaces, to apparatus and systems including the same, and to methods of making and using the same.

BACKGROUND

Bearings are employed in myriad applications including, but not limited to, aircraft, aerospace, transportation, defense, agriculture, mining, construction, and energy (e.g., oil and gas drilling and production tools). Bearings can have many different configurations, such as radial bearings, axial bearings (e.g., thrust bearings), combination radial and axial bearings, linear bearings, and power transmission surface bearings.

When diamond elements are used in moving parts, typically both the engagement surface and the opposing engagement surface of the bearing assembly is composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. At certain surface speeds in moving parts, load and attendant temperature generated, such as at a cutting tip, often exceeds the graphitization temperature of diamond (i.e., about 700° C.), which can, in the presence of a diamond reactive material, lead to rapid wear and failure of components. Without being bound by theory, the specific failure mechanism is believed to result from the chemical interaction of the carbon bearing diamond with the carbon attracting material that is being machined. An exemplary reference concerning the contraindication of diamond for diamond reactive material machining is U.S. Pat. No. 3,745,623. The contraindication of diamond for machining diamond reactive material has long caused the avoidance of the use of diamond in all contacting applications with such materials.

When using diamond as a bearing surface, contact between an edge of the diamond and the opposing bearing surface can lead to undesirable interaction between the diamond and the opposing bearing surface, including gouging of the opposing bearing surface and wear of the diamond bearing surface and/or edges of the diamond bearing surface.

BRIEF SUMMARY

Some embodiments of the present disclosure include a bearing assembly. The bearing assembly includes a bearing and a part. The bearing has a bearing body and a first bearing surface. The part has a body and a second bearing surface. One of the first and second bearing surfaces is a polycrystalline diamond bearing surface, and the other of the first and second bearing surfaces is a metal bearing surface including a metal. The polycrystalline diamond bearing surface has a surface finish of 20 μin Ra or less. The metal contains at least 2 weight percent of a diamond solvent-catalyst based on a total weight of the metal. The bearing is coupled with the part such that the metal bearing surface is engaged with the polycrystalline diamond bearing surface along a diamond contact area of the polycrystalline diamond bearing surface. The polycrystalline diamond bearing surface is a continuous surface along the diamond contact area.

Some embodiments of the present disclosure include a bearing assembly. The bearing assembly includes a bearing and a part. The bearing has a bearing body and a first bearing surface. The part has a body and a second bearing surface. One of the first and second bearing surfaces is a polycrystalline diamond bearing surface, and the other of the first and second bearing surfaces is a metal bearing surface including a metal. The polycrystalline diamond bearing surface has a surface finish of 20 μin Ra or less. The metal contains at least 2 weight percent of iron, cobalt, nickel, titanium, copper, ruthenium, rhodium, palladium, chromium, manganese, or tantalum based on a total weight of the metal. The bearing is coupled with the part such that the metal bearing surface is engaged with the polycrystalline diamond bearing surface along a diamond contact area of the polycrystalline diamond bearing surface. The polycrystalline diamond bearing surface is a continuous surface along the diamond contact area.

Some embodiments of the present disclosure include a method of making a bearing assembly. The method includes providing a bearing and a shaft. The bearing has a bearing body and a first bearing surface. The shaft has a shaft body and a second bearing surface. One of the first and second bearing surfaces is a polycrystalline diamond bearing surface, and the other of the first and second bearing surfaces is a metal bearing surface including a metal. The metal contains at least 2 weight percent of a diamond solvent-catalyst based on a total weight of the metal. The method includes lapping the diamond bearing surface, polishing the polycrystalline diamond bearing surface, or combinations thereof such that the polycrystalline diamond bearing surface has a surface finish of 20 μin Ra or less. The method includes coupling the shaft with the bearing such that the metal bearing surface is engaged with the polycrystalline diamond bearing surface along a diamond contact area of the polycrystalline diamond bearing surface. The polycrystalline diamond bearing surface is a continuous surface along the diamond contact area. The polycrystalline diamond bearing surface is bound by boundary edges of the polycrystalline diamond bearing surface, and the metal bearing surface is engaged with the polycrystalline diamond bearing surface entirely within the boundary edges.

Some embodiments of the present disclosure include a method of making a bearing. The method includes providing a bearing body, and applying a polycrystalline diamond layer onto a surface of the bearing body. The polycrystalline diamond layer has a polycrystalline diamond bearing surface. The polycrystalline diamond bearing surface is a continuous surface along a diamond contact area of the bearing. The method includes lapping the polycrystalline diamond bearing surface, polishing the polycrystalline diamond bearing surface, or combinations thereof such that the polycrystalline diamond bearing surface has a surface finish of 20 μin Ra or less.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 2A is a perspective view of a bearing assembly including a radial journal bearing, the same as or similar to that shown in FIG. 1A, engaged with a shaft.

FIG. 2B is a cross-sectional view of the bearing assembly of FIG. 2A.

FIG. 2C is detail view of the bearing assembly of FIG. 2B.

FIG. 4A is a perspective view of a conical bearing.

FIG. 4B is a cross-sectional view of the conical bearing of FIG. 4A.

FIG. 4C is a perspective view of a bearing assembly including the conical bearing of FIG. 4A engaged with a shaft.

FIG. 4D is a cross-sectional view of the bearing assembly of FIG. 4C.

FIG. 6A depicts a bearing assembly including a spherical bearing, ball, or swivel joint engaged with a shaft.

FIG. 6B depicts a cross sectional view of the bearing assembly of FIG. 6A.

FIG. 7A depicts an axial bearing assembly including an axial bearing engaged with a shaft.

FIG. 7B depicts a cross sectional view of the axial bearing assembly of FIG. 7A.

FIG. 8A is a cross-sectional view of a combined axial and radial bearing assembly including a combined and integral axial and radial bearing engaged with a shaft.

FIG. 8B is a perspective view of the combined axial and radial bearing assembly of FIG. 8A, with the axial and radial bearing in cross-section.

FIG. 8C is a perspective view of the combined axial and radial bearing assembly of FIG. 8A.

FIG. 9A is a perspective view of a radial bearing element.

FIG. 9B is a perspective view of an axial bearing element.

FIG. 9C is a perspective view of a bearing housing.

FIG. 9D is a perspective, cross-sectional view of a combined axial and radial bearing including the radial bearing element of FIG. 9A and axial bearing element of FIG. 9B coupled with the housing of FIG. 9C.

FIG. 9E is a cross-sectional view of a combined axial and radial bearing assembly including the combined axial and radial bearing of FIG. 9D engaged with a shaft.

DETAILED DESCRIPTION

Figure 1B:
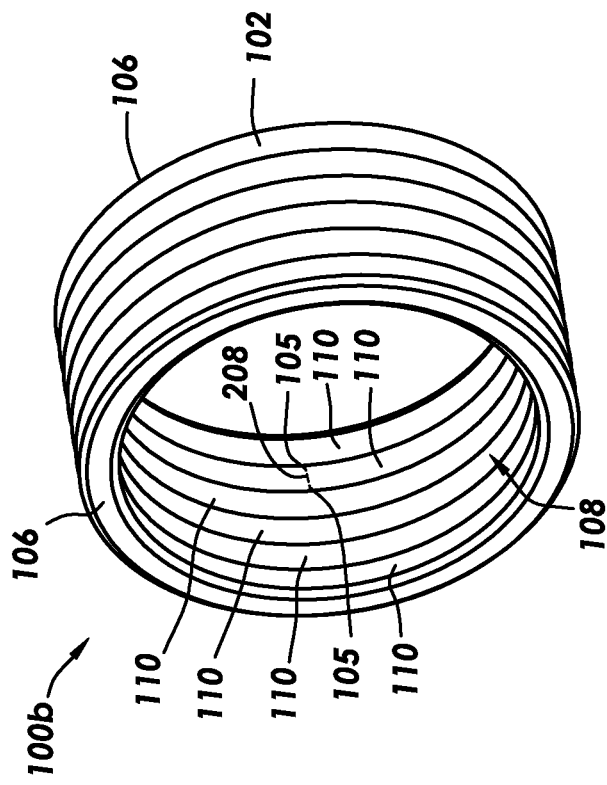
FIG. 1B is a perspective view of a radial journal bearing having multiple, segmented 0bearing surfaces that extend circumferentially along an interior surface of the radial journal bearing, with each individual, segmented bearing surface being a continuous polycrystalline diamond bearing surface.

Certain embodiments of the present disclosure include bearings that include continuous polycrystalline diamond bearing surfaces, to apparatus and systems including the same, and to methods of making and using the same.

Diamond Bearing Surfaces

The bearing assemblies disclosed herein include a polycrystalline diamond engagement surface (also referred to as a polycrystalline diamond bearing surface) engaged with an opposing engagement surface (also referred to as an opposing bearing surface). The polycrystalline diamond may be or include thermally stable polycrystalline diamond, either supported or unsupported by a support, such as a tungsten carbide support. The polycrystalline diamond may be or include a polycrystalline diamond compact (PDC). In certain applications, the polycrystalline diamond disclosed herein has increased cobalt content transitions layers between an outer polycrystalline diamond surface and a supporting tungsten carbide slug. The polycrystalline diamond may be non-leached, leached, leached and backfilled, thermally stable, or coated with a material via chemical vapor deposition (CVD). In some embodiments, the polycrystalline diamond is formed via a CVD process. Throughout the descriptions of the embodiments in this disclosure, for the sake of brevity and simplicity, "diamond" is used to refer to "polycrystalline diamond." That is, the "diamond bearing surfaces" disclosed herein are "polycrystalline diamond bearing surfaces" and the "diamond bearing elements" are "polycrystalline diamond bearing elements."

In some embodiments, the engagement surfaces of the diamond disclosed herein are planar, convex, or concave. In some embodiments, the diamond has prepared edges, such as bevels, radii, or honed edges. One performance criterion is that the diamond is configured and positioned in such a way as to minimize or preclude edge contact with the opposing bearing surface. In some aspects, the diamond is subjected to edge radius treatment to facilitate avoidance of edge contact with the opposing bearing surface. The edge geometry of the diamond can be subjected to a surface roughness reduction process, such as lapping and/or polishing. In other embodiments, the edge geometry of the diamond is not subjected to a surface roughness reduction process.

In certain applications, the diamond, or at least the engagement surface thereof, is lapped or polished, optionally highly lapped or highly polished. Although highly polished diamond is used in at least some applications, the scope of this disclosure is not limited to highly polished diamond and includes diamond that is highly lapped or polished. As used herein, a surface is defined as "highly lapped" if the surface has a surface roughness of 20 μin Ra or less than about 20 μin Ra, such as a surface roughness ranging from about 18 to about Ra. As used herein, a surface is defined as "polished" if the surface has a surface roughness of between 2 to about 10 μin. As used herein, a surface is defined as "highly polished" if the surface has a surface roughness of less than 2 μin Ra. Typical "highly polished" surfaces have a surface roughness of from about 0.5 μin to less than about 2 μin.

In some aspects, the diamond bearing surfaces disclosed herein have a surface roughness ranging from 0.5 μin Ra to 20 μin Ra, or from 2 μin Ra to 18 μin Ra, or from 5 μin Ra to 15 μin Ra, or from 8 μin Ra to 12 μin Ra, or less than 20 μin Ra, or less than 18 μin Ra, or less than 10 μin Ra, or less than 2 μin Ra, or any range or value therebetween. Without being bound by theory, it is believed that diamond that has been polished to a surface roughness of 0.5 μin has a coefficient of friction that is less than (e.g., about half or more than half) of standard lapped diamond that has a surface roughness of 20-40 μin. U.S. Pat. Nos. 5,447,208 and 5,653,300 to Lund et al. provide disclosure relevant to polishing of diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish or roughness may be measured with a profilometer, laser microscope, or with Atomic Force Microscopy, for example.

Opposing Bearing Surfaces

In some embodiments, the opposing bearing surface includes a diamond reactive material. As used herein, a "diamond reactive material" is a material that contains more than trace amounts of diamond solvent-catalyst (also referred to as a diamond catalyst-solvent). Some examples of known diamond solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As used herein, a material that contains more than "trace amounts" of diamond solvent-catalyst is a material that contains at least 2 percent by weight (wt. %) diamond solvent-catalyst based on a total weight of the material. As would be understood by one skilled in the art, diamond solvent-catalysts are chemical elements, compounds, or materials (e.g., metals) that are capable of catalyzing the formation of diamond, such as by promoting intercrystallite diamond-to-diamond bonding between diamond grains to form a polycrystalline diamond. As would be understood by one skilled in the art, diamond solvent-catalysts are chemical elements, compounds, or materials (e.g., metals) that are capable of solubilizing polycrystalline diamond by catalyzing the reaction of the diamond into graphite, such as under load and at a temperature at or exceeding the graphitization temperature of diamond. Diamond solvent-catalysts are capable of catalyzing the graphitization of diamond (e.g., polycrystalline diamond), such as when under load and at a temperature at or exceeding the graphitization temperature of the diamond (i.e., about 700° C.). Diamond reactive materials include, but are not limited to, metals including metal alloys, and composite materials that contain more than trace amounts of diamond solvent-catalysts. Some exemplary diamond solvent-catalysts include iron, cobalt, nickel, ruthenium, rhodium, palladium, chromium, manganese, copper, titanium, and tantalum. Thus, a diamond reactive material can be a material that includes more than trace amounts of iron, cobalt, nickel, ruthenium, rhodium, palladium, chromium, manganese, copper, titanium, tantalum, or combinations thereof. One exemplary diamond reactive material is steel.

The diamond reactive material disclosed herein may be a metal or metal alloy (collectively referred to herein as a "metal" or a "metallic material") having a metal surface. As would be understood by one skilled in the art metals include materials that contain metal atoms that are typically characterized by metallic bonding between the metal atoms. That is, metals can be characterized as having metal atoms that are chemically bonded together, with at least predominantly metallic bonding between the metal atoms (e.g., in a crystalline structure of the metal atoms). The metals disclosed herein are not ceramics (e.g., carbides, oxides, nitrides, natural diamond), plastics, or composites (e.g., ceramic matrix composites or metal matrix composites, such as cermets, cemented carbide cobalt composites, PCD cobalt binder composites, CBN cobalt binder composites). In some embodiments the metal is a metal alloy. In other embodiments the metal is not a metal alloy (i.e., contains a single metal). The metal may be ferrous or a ferrous alloy. For example, the metal may be iron or an iron alloy, such as cast iron or steel, such as stainless steel, carbon steel, tool steel, or alloy steels. The metal may be non-ferrous or a non-ferrous alloy. For example, the metal may be nickel or a nickel alloy, cobalt or a cobalt alloy, copper or a copper alloy, titanium or a titanium alloy, ruthenium or a ruthenium alloy, rhodium or a rhodium alloy, palladium or a palladium alloy, chrome or a chrome alloy, manganese or a manganese alloy, or tantalum or a tantalum alloy.

In embodiments where the diamond reactive material is a metal, the opposing bearing surface is a metal surface. The opposing bearing surface may include a metal that contains at least 2 wt. % of a diamond solvent-catalyst based on a total weight of the metal. In some embodiments, the opposing bearing surface is or includes a metal that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal, or any range or value therebetween. In some embodiments, the opposing bearing surface is or includes a metal that contains at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the metal.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of metal based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of metal based on a total weight of the diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the diamond reactive material.

In some embodiments, less than an entirety of the opposing bearing surface includes the diamond reactive material, with the provision that the metal contact area of the opposing bearing surface includes diamond reactive material in at least one position along the contact path between the metal contact area and the diamond contact area. For example, the opposing bearing surface may include a section of diamond reactive material adjacent a section of another material that is not a diamond reactive material.

In some embodiments, the diamond reactive material is a superalloy including, but not limited to, an iron-based superalloy, a cobalt-based superalloy, or a nickel-based superalloy.

In certain embodiments, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. Superhard materials are materials with a hardness value exceeding 40 gigapascals (GPa) when measured by the Vickers hardness test. The diamond reactive materials disclosed herein are softer than a superhard material. For example, the diamond reactive materials disclosed herein may have a hardness value of less than 40 GPa, or less than 35 GPa, or less than 30 GPa, or less than 25 GPa, or less than 20 GPa, or less than 15 GPa, or less than 10 GPa, or less than 8 GPa, or less than 6 GPa, or less than 5 GPa, or less than 4 GPa, or less than 3 GPa, or less than 2 GPa, or less than 1 GPa when measured by the Vickers hardness test. The diamond reactive materials disclosed herein are softer than tungsten carbide (WC), which has a hardness of about 25 GPa. The diamond reactive materials disclosed herein include materials that are softer than tungsten carbide tiles, cemented tungsten carbide, and infiltrated tungsten carbide. The diamond reactive materials disclosed herein include materials that are softer than silicon carbide, silicon nitride, cubic boron nitride, and polycrystalline diamond. One skilled in the art would understand that hardness may be determined by different tests, including a Brinell scale test in accordance with ASTM E10-18; the Vickers hardness test in accordance with ASTM E92-17; the Rockwell hardness test in accordance with ASTM E18; and the Knoop hardness test in accordance with ASTM E384-17.

In some embodiments, the diamond reactive materials are in the form of hardfacings, coatings, or platings on another material, such that the diamond reactive material forms the opposing bearing surface. In such embodiments, the hardfacing, coating, or plating includes the diamond reactive material. In some such embodiment, the material underlying the hardfacing, coating, or plating is not a diamond reactive material. In other such embodiments, the material underlying the hardfacing, coating, or plating is a diamond reactive material (the same or different than the overlying hardfacing, coating, or plating).

In some embodiments, the opposing bearing surface has carbon applied thereto. In some such embodiments, the carbon is applied to the opposing bearing surface prior to engagement with the diamond bearing surface. For example, the opposing bearing surface may be saturated with carbon. Without being bound by theory, it is believed that such application of carbon reduces the ability of the diamond solvent-catalyst in the opposing bearing surface to attract carbon through graphitization of the surface of the polycrystalline diamond element. That is, the carbon that is applied to the opposing bearing surface functions as a sacrificial layer of carbon. In such embodiments, the opposing bearing surface that underlies the carbon includes the diamond reactive material.

In some embodiments, the opposing bearing surface is a treated surface in accordance with U.S. patent application Ser. No. 16/425,758. For example, the opposing bearing surface (also referred to as the opposing engagement surface) may be hardened, such as via cold working and work hardening processes including burnishing and shot peening; and/or heat-treating processes including through hardening, case hardening, and subzero, cryogenic, deep-freezing treatments. Also, the opposing bearing surface may be plated and/or coated, such as via electroplating, electroless plating, including chromium plating, phosphating, vapor deposition, including physical vapor deposition (PVD) and chemical vapor deposition (CVD); or anodizing. Also, the opposing bearing surface may be cladded, such as via roll bonding, laser cladding, or explosive welding.

In some embodiments, the opposing bearing surface has a surface roughness of from 0.5 to 2,000 μin Ra, or from 1 to 1,900 μin Ra, or from 5 to 1,500 μin Ra, or from 10 to 1,200 μin Ra, or from 50 to 1,000 μin Ra, or from 100 to 800 μin Ra, or from 200 to 600 μin Ra. In some embodiments, the opposing bearing surface has a surface roughness that is equal to, less than, or greater than the diamond bearing surface.

Engaged Bearing Surfaces

In some embodiments, the present disclosure provides for interfacing the contact between the diamond bearing surface of a bearing and the opposing bearing surface of a part. Interfacing the contact may include engaging the diamond bearing surface in sliding contact with the opposing bearing surface. As used herein, "engagement surface" or "bearing surface" refers to the surface of a material or component (e.g., the surface of polycrystalline diamond or the surface of a diamond reactive material) that is positioned and arranged within a bearing assembly such that, in operation of the bearing, the "engagement surface" or "bearing surface" is positioned and/or available to interface the contact between two components to bear load (e.g., radial and/or axial load). In some embodiments, the diamond bearing surface disclosed herein is in direct contact with an opposing bearing surface without a fluid film therebetween (i.e., boundary lubrication). In some embodiments, a fluid film is positioned and/or develops between the diamond bearing surface and the opposing bearing surface such that the surfaces are not directly in contact with one another, but are engaged through the fluid film (i.e., hydrodynamic lubrication). In some embodiments, the contact between the diamond bearing surface and opposing bearing surface is between (or a mixture of) or varies between direct contact and fluid film (i.e., mixed boundary lubrication).

Bearing Assemblies

In some embodiments, the diamond bearings disclosed herein are coupled with or otherwise incorporated into or with a bearing assembly. For example, the diamond bearings may be a portion of an axial bearing assembly, a radial bearing assembly, or a combined axial and radial bearing assembly. In some embodiments, the bearing assembly is a journal bearing, conical bearing, or spherical bearing. The diamond bearings are not limited to being incorporated into the specific exemplary bearing assemblies shown herein.

Some embodiments include a bearing assembly that includes one or more of the diamond bearing surfaces engaged with one or more of the opposing bearing surfaces. In some such embodiments, the diamond bearing surface is in sliding engagement with the opposing bearing surface. Depending on the desired configuration of the bearing assembly, the sliding engagement between the diamond bearing surface and the opposing bearing surface may be a flat surface interface, a curved (e.g., cylindrical) surface interface, or a combination of flat and curved surface interfaces.

Radial Journal Bearing

In some embodiments, the diamond bearing disclosed herein is a radial journal bearing having a diamond bearing surface. With reference to FIG. 1A, one embodiment of a radial journal bearing in accordance with the present disclosure is depicted. Radial journal bearing 100a has the form of a ring with an external surface 102, an internal surface, and sides 106 therebetween. The internal surface is a diamond bearing surface 104. Diamond bearing surface 104 has boundary edges 105 and a width 208. While the width 208 is shown as being constant about the internal circumference of radial journal bearing 100a, the bearings disclosed herein are not limited to having constant widths, and may have widths that vary. Between boundary edges 105, diamond bearing surface 104 extends continuously, circumferentially about the internal circumference of radial journal bearing 100a. That is, between boundary edges 105, diamond bearing surface 104 is uninterrupted by any boundary edges. Radial journal bearing 100a has a cavity 108 defined by the diamond bearing surface 104. One exemplary use of the radial journal bearing 100a is being coupled with a shaft such that the shaft extends through cavity 108. In such embodiments, the shaft may be rotated (clockwise and/or counterclockwise) within cavity 108 along rotational line 111 about axis 109 such that an exterior surface of the shaft is slidingly engaged with the diamond bearing surface 104 and slides along the diamond bearing surface 104 while rotating relative to the diamond bearing surface 104. In such an embodiment, the outer surface of the shaft would be the opposing bearing surface including a diamond reactive material.

Figure 1A:
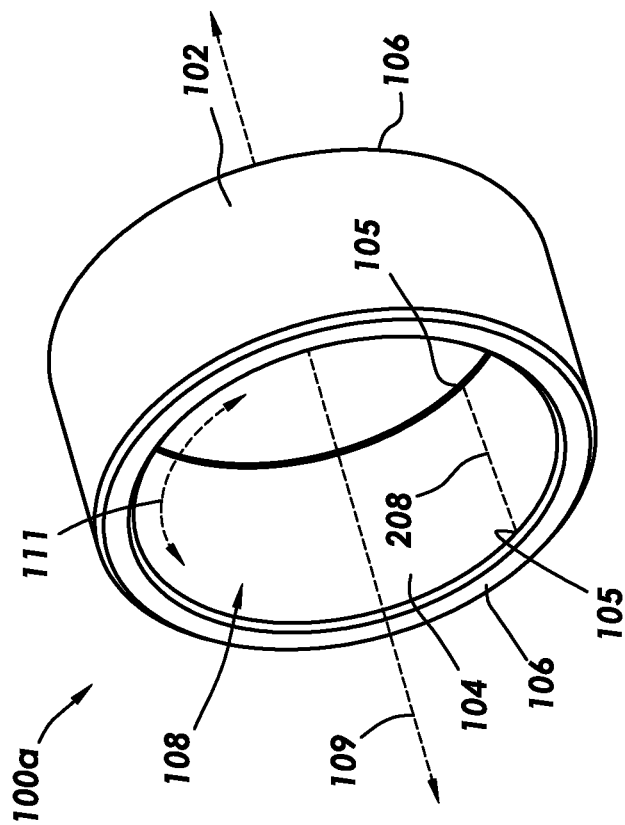
FIG. 1A is a perspective view of a radial journal bearing having a continuous polycrystalline diamond bearing surface.

FIG. 1B depicts another embodiment of a radial journal bearing in accordance with the present disclosure. Radial journal bearing 100b is substantially similar to radial journal bearing 100a, with the exception that the diamond bearing surface of radial journal bearing 100b is segmented. That is, radial journal bearing 100b includes a plurality of diamond bearing surfaces 110. Each diamond bearing surface 110 has boundary edges 105 and a width 208. The plurality of diamond bearing surfaces 110 are arranged to extend continuously, circumferentially about the internal circumference of radial journal bearing 100b. As shown in FIG. 1B, the edges of each segment of the plurality of diamond bearing surfaces 110 extend parallel to the edges of the other segments of the plurality of diamond bearing surfaces 110. However, the diamond bearing surfaces disclosed herein are not limited be having edges that extend parallel to one another. In the embodiment shown in FIG. 1B, each diamond bearing surface 110 is a separate surface from the adjacent diamond bearing surface(s). One exemplary use of the radial journal bearing 100b is being coupled with a shaft such that the shaft extends through cavity 108. In such embodiments, the shaft is rotatable within cavity 108 such that an exterior surface of the shaft is slidingly engaged with the diamond bearing surfaces 110 and slides along the diamond bearing surfaces 110 as the shaft rotates relative to the diamond bearing surfaces 110. In such an embodiment, a plurality of outer surfaces on the shaft would be the opposing bearing surfaces, each engaged with one of the diamond bearing surfaces 110.

Continuous Bearing Surface

In some embodiments, the bearings disclosed herein have continuous diamond bearing surfaces. For example, a bearing component (e.g., a radial journal bearing) having a diamond bearing surface may be coupled with an opposing bearing component (e.g., a shaft) having an opposing bearing surface such that the opposing bearing is slidingly engaged with the diamond bearing surface along a diamond contact area of the diamond bearing surface, and such that the diamond bearing surface is "continuous" along the diamond contact area. As used herein, "diamond contact area" refers to the entire portion of the surface area of the diamond bearing surface that contacts (directly or through a fluid film) the opposing bearing surface during operation (i.e., relative movement) of the bearing and the part that includes the opposing bearing surface. That is, the diamond contact area is the portion of the surface area of the diamond bearing surface that contacts the opposing bearing surface during operation of the bearing assembly. The diamond contact area is only a portion of the diamond bearing surface, and is spaced apart from each boundary edge of the diamond bearing surface, such that there is at least some surface area of the diamond bearing surface positioned between the diamond contact area and the boundary edges of the diamond bearing surface. In embodiments where the bearing is a radial bearing, the diamond contact area of the radial bearing is the surface area of the diamond bearing surface that contacts the opposing bearing surface during rotation of the opposing component. The diamond contact area has a surface area that is less than a surface area of the diamond bearing surface. That is, less than an entirety of the diamond bearing surface forms the diamond contact area. As used herein, a diamond bearing surface is a "continuous surface" along an entirety of the diamond contact area when the diamond bearing surface is uninterrupted by any diamond edges throughout the entirety of the diamond contact area. That is, during operation, while the opposing bearing surface slides along the diamond contact area, the opposing bearing surface does not slide on, along, or contact any edges of the diamond bearing surface. For example, with reference to FIG. 1A, diamond bearing surface 104 is "continuous" along the circumferential extension of the diamond bearing surface between boundary edges 105. With reference to FIG. 1B, each diamond bearing surface 110 is "continuous" along the circumferential extension of the surfaces between boundary edges 105. In some embodiments, such as in a radial bearing, the diamond contact area is a radial contact area. That is, the sliding movement of the opposing bearing surface along the diamond contact area on the diamond bearing surface is a radial, rotating movement along the diamond contact area. In other embodiments, the diamond contact area is an axial contact area. That is, the sliding movement of the opposing bearing surface on the diamond bearing surface is an axial movement along the diamond contact area. In some embodiments, the diamond contact area is both a radial and axial diamond contact area.

The bearing having the diamond bearing surface may be coupled with the part having the opposing bearing surface such that a metal contact area of the opposing bearing surface is slidingly engaged with the diamond contact area. As used herein, "metal contact area" refers to the entire portion of the surface area of the opposing bearing surface that contacts (directly or through a fluid film) the diamond contact area during operation (i.e., during relative movement) of the bearing and the part that includes the opposing bearing surface. That is, the metal contact area is the portion of the surface area of the opposing bearing surface that contacts the diamond contact area during operation of the bearing assembly. In embodiments where the bearing is a radial bearing, the metal contact area is the surface area of the opposing bearing surface that contacts the diamond contact area during relative rotation of the bearing and part. During operation, while the metal contact area slides along the diamond contact area without sliding on, along, or contacting boundary edges of the diamond bearing surfaces, and the diamond bearing surface slides on, along, and contacts boundary edges of the opposing bearing surface. In some embodiments, such as in a radial bearing, the metal contact area is a radial contact area. That is, the sliding movement of the metal contact area along the diamond contact area is a radial, rotating movement. In other embodiments, the metal contact area is an axial contact area. That is, the sliding movement of the metal contact area on the diamond contact area is an axial movement. In some embodiments, the metal contact area is both a radial and axial diamond contact area. In some embodiments, the metal contact area is an entirety of the opposing bearing surface, such that an entirety of the opposing bearing surface is engaged with less than an entirety of the diamond bearing surface. Both the metal contact area and the diamond contact area are surfaces, such that the contact between the metal contact area and the diamond contact area is a contact between two surface areas (e.g., is a planar contact or contact between two curved surfaces). Thus, contact between the metal contact area and the diamond contact area is a planar contact between the contact areas, or is a contact between two curved surfaces that form the contact areas. As the metal contact area only contacts the diamond bearing surface entirely within the boundary edges of the diamond bearing surface, portions of the diamond bearing surface slide on, along, and contact (directly or through a fluid film) with the boundary edges of the metal bearing surface.

The diamond contact area defines a path (or paths) along which the metal contact area contacts the diamond engagement surface. The path on the diamond engagement surface that is defined by the diamond contact area provides for a purely surface area contact with the metal contact area, with the path tracing a surface area of the diamond engagement surface. Additionally, the metal contact area defines a path (or paths) along which the diamond contact area contacts the opposing engagement surface. The path on the opposing engagement surface that is defined by the metal contact area provides for a purely surface area contact with the diamond contact area, with the path tracing a surface area of the opposing engagement surface.

In some embodiments of operation of the bearing assemblies disclosed herein, the metal contact area does not maintain contact with the diamond contact area throughout the entire path defined by the diamond contact area. For example, the metal contact area may be intermittently spaced apart from the diamond contact area during the tracing of the metal contact area over the path defined by the diamond contact area (e.g., where the metal and diamond contact areas are not perfectly engaged, parallel, and/or aligned). In such embodiments, the contact path (or paths) of the diamond contact area may be engaged by the metal contact area at multiple discrete locations and/or multiple discrete times. In such embodiments, the metal contact area does not slide on, along, or contact the boundary edges of the diamond bearing surface at any of the multiple discrete locations and/or multiple discrete times. Thus, for the diamond bearing surface to be a continuous surface along the entirety of the diamond contact area, it is not necessary for the metal contact area to be continuously in contact with the diamond contact area, provided that the metal bearing surface does not engage with any boundary edges of diamond bearing surface.

In other embodiments of operation of the bearing assemblies disclosed herein, the metal contact area does maintain contact with the diamond contact area throughout the entire path defined by the diamond contact area. In such embodiments, the metal contact area is in contact with the diamond contact area throughout the tracing of the entire path defined by the diamond contact area. In such embodiments, the metal contact area does not slide on, along, or contact the boundary edges of the diamond bearing surface at any location throughout the entire diamond contact area. In some embodiments, the diamond bearing surface is a single, continuous surface.

While exemplary bearing surfaces disclosed herein are shown and described as curved surfaces such that a section of surface area (the metal contact area) of the opposing bearing surface is in sliding contact with a section of surface area (the diamond contact area) of the diamond bearing surface, the bearing surfaces may have other forms and geometries than those shown herein, provided that metal bearing surface does not engage with any boundary edges of the diamond bearing surface.

While movement between the bearing and part within the exemplary bearing assemblies disclosed herein is described (at least primarily) as being rotational and/or axial movement, the bearing assemblies disclosed herein may exhibit other movements. For example, the bearing assembly may exhibit vibrational movements. Vibrational movements within such a bearing assembly may alter which portions of the surface area of the diamond bearing surface are occupied by the diamond contact area. In such embodiments, the size (e.g., width) of the diamond bearing surface and/or the opposing bearing surface may be designed to account for such vibrational movements such that, regardless of the vibrational movements, the opposing bearing surface does not engage with any boundary edges of the diamond bearing surface. That is, the diamond bearing surface and/or the opposing bearing surface may be provided with tolerance to account for such vibrational movements or other additional movements within the bearing assembly.

While the radial journal bearings of FIGS. 1A and 1B are shown and described as having continuous diamond bearing surfaces that can be coupled with a shaft that has an opposing bearing surface of diamond reactive material, this arrangement can be reversed. For example, the shaft can have a continuous diamond bearing surface and the radial journal bearings of FIGS. 1A and 1B can have an opposing bearing surface of diamond reactive material.

Radial Journal Bearing and Shaft Assembly

Some embodiments of the present disclosure include a bearing assembly that includes a bearing having a diamond bearing surface that is in sliding engagement with an opposing bearing surface. With reference to FIGS. 2A-2C, bearing assembly 200 is depicted. Bearing assembly 200 includes shaft 202 slidingly engaged within the cavity 108 of radial journal bearing 100a. Shaft 202 includes opposing bearing surface 204. Opposing bearing surface 204 is slidingly engaged with diamond bearing surface 104 of radial journal bearing 100a. Opposing bearing surface 204 has a width 206, as defined by the distance between boundary edges 205 of opposing bearing surface 204. Diamond bearing surface 104 has a width 208, as defined by the distance between boundary edges 105 as shown in FIG. 1A. Width 208 is greater than width 206, and opposing bearing surface 204 is engaged with diamond bearing surface 104 such that opposing bearing surface 204 is positioned between boundary edges 105 and does not contact boundary edges 105. As such, opposing bearing surface 204 is engaged with diamond bearing surface 104 entirely within boundary edges 105 of diamond bearing surface 104. As used herein, "boundary edges" of a surface are edges that are or define the perimeter of the surface. With opposing bearing surface 204 engaged with diamond bearing surface 104 entirely within the boundary edges 105 of diamond bearing surface 104, opposing bearing surface 204 does not engage with the boundary edges 105 of diamond bearing surface 104. Thus, bearing assembly 200 avoids contact between opposing bearing surface 204 and any edges of diamond bearing surface 104. In some embodiments, the surface area of the opposing bearing surface 204 is smaller than the surface area of the diamond bearing surface 104. In some embodiments, an entirety of the surface area of opposing bearing surface 204 is engaged with less than an entirety of the surface area of diamond bearing surface 104. The portion of diamond bearing surface 104 that opposing bearing surface 204 is engaged with during operation of bearing assembly 200 is the contact area of diamond bearing surface 104. Thus, throughout the use of bearing assembly 200, opposing bearing surface 204 remains engaged with diamond bearing surface 104 along the diamond contact area of diamond bearing surface 104, which diamond contact area falls entirely within the boundary edges 105 of diamond bearing surface 104, such that opposing bearing surface 204 does not engage with boundary edges 105 of diamond bearing surface 104.

In some embodiments, the opposing bearing surface 204 is not a continuous bearing surface (i.e., is a discontinuous bearing surface), and may include multiple, discrete bearing surfaces. For example, the opposing bearing surfaces disclosed herein may be surfaces (e.g., metal surfaces) that have edges that are engaged with the diamond contact area of the diamond bearing surface within the boundary edges of the diamond bearing surface.

While the radial journal bearings of FIGS. 2A-2C are shown and described as having continuous diamond bearing surfaces that are coupled with a shaft that has an opposing engagement surface of diamond reactive material, this arrangement can be reversed. For example, the shaft can have a continuous diamond bearing surface and the radial journal bearings can have an opposing bearing surface of diamond reactive material.

Radial Journal Bearing and Shaft Assembly with Segmented Bearing Surfaces

Figure 3B:
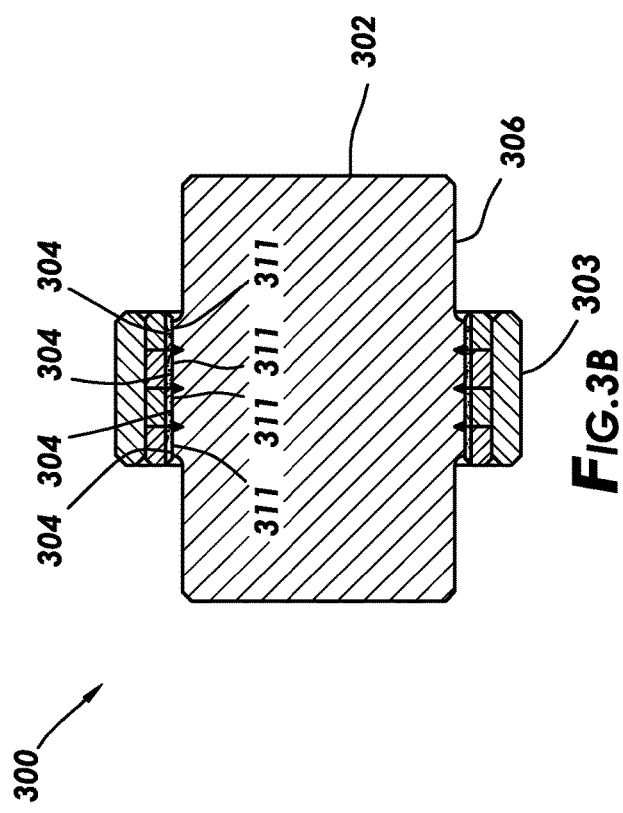
FIG. 3B is a view of the bearing assembly of FIG. 3A with both the radial journal bearing and shaft in cross-section.
Figure 3D:
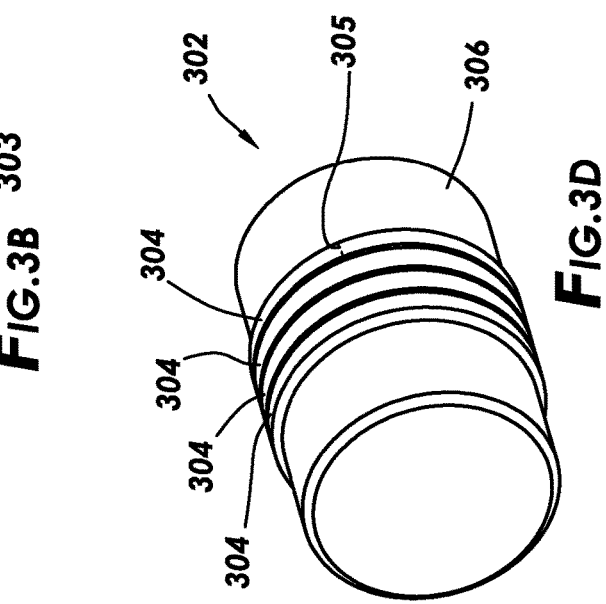
FIG. 3D depicts the shaft of FIG. 3A in isolation from the radial journal bearing.
Figure 3A:
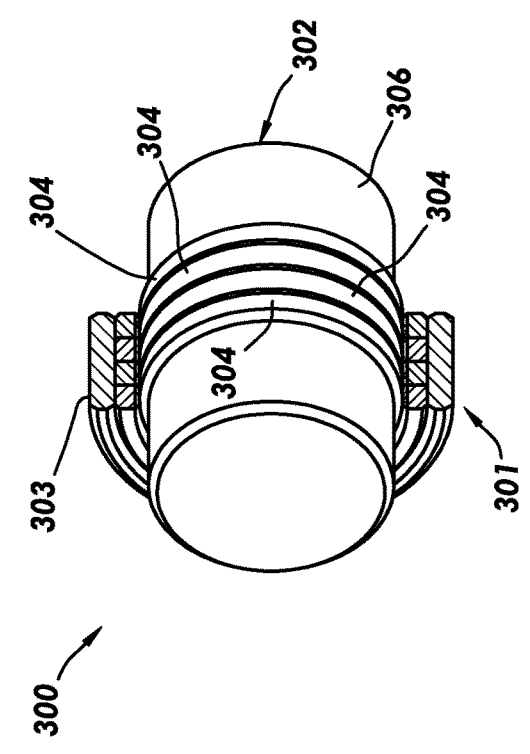
FIG. 3A is a perspective view of a bearing assembly including a radial journal bearing, the same as or similar to that shown in FIG. 1B, engaged with a shaft, and with the radial journal bearing in cross-section.
Figure 3C:
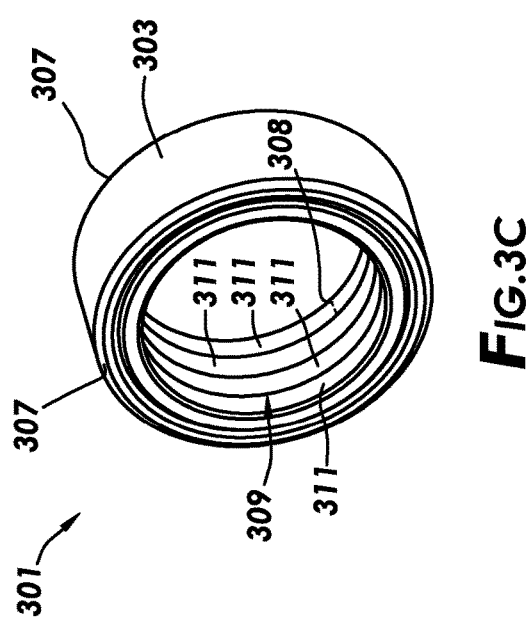
FIG. 3C depicts the radial journal bearing of FIG. 3A in isolation from the shaft.

With reference to FIGS. 3A-3D, bearing assembly 300 and components thereof are depicted. Bearing assembly 300 includes shaft 302 slidingly engaged within the cavity 309 of radial journal bearing 301. Radial journal bearing 301 may be the same as or similar to radial journal bearing 100b shown in FIG. 1B. Radial journal bearing 301 includes bearing housing 303 having sides 307. A plurality of segmented diamond bearing surfaces 311 are on the internal circumference of housing 303. Shaft 302 includes shaft body 306 and a plurality of segmented opposing bearing surfaces 304 on shaft body 306. In FIGS. 3A and 3B, shaft 302 is engaged within cavity 309 such that each opposing bearing surface 304 is slidingly engaged with one of the diamond bearing surfaces 311. In the same manner as described with respect to FIGS. 1A-2C, each opposing bearing surface 304 has a smaller width 305 than the width 308 of the diamond bearing surface 311 to which it is engaged, such that each opposing bearing surface 304 is engaged with a diamond contact area that is entirely within the boundary edges of the diamond bearing surface 311 to which it is engaged. Bearing assembly 300 is configured for shaft 302 to rotate within bearing 301.

While the radial journal bearings of FIGS. 3A-3D are shown and described as having multiple continuous diamond bearing surfaces that are coupled with a shaft that has an opposing bearing surface of diamond reactive material, this arrangement can be reversed. For example, the shaft can have continuous diamond bearing surface(s) and the radial journal bearings can have opposing bearing surface(s) of diamond reactive material.

Angular Contact Bearing—Conical Bearing

Some embodiments of the present disclosure include an angular contact bearing, such as a conical bearing. In some such embodiments, a conical bearing assembly that includes a conical bearing having a diamond bearing surface that is in sliding engagement with an opposing bearing bearing surface. With reference to FIGS. 4A-4D, one exemplary conical bearing and bearing assembly is depicted. Conical bearing 400 includes bearing housing 402 with cavity 408. Bearing housing 402 includes a conical diamond bearing surface 404 thereon. Conical diamond bearing surface 404 is a continuous bearing surface within the boundary edges 405, and has a width 407.

As shown in FIGS. 4C and 4D, conical bearing 400 is engaged with shaft 420 in a conical bearing assembly 490. Shaft 420 extends through cavity 408 and includes bearing element 421 having opposing bearing surface 422 thereon. Opposing bearing surface 422 is positioned on shaft 420 to slidingly engage with diamond bearing surface 404 when shaft 420 is positioned within cavity 408. Opposing bearing surface 422 has a width 423 between boundary edges 425 of opposing bearing surface. In the same or similar manner as described with respect to FIGS. 1A-3D, opposing bearing surface 422 has a smaller width, width 423, than the width 407 of the diamond bearing surface 404, such that opposing bearing surface 422 is engaged with the diamond contact area entirely within the boundary edges 405 of the diamond bearing surface 404 to which it is engaged. Thus, the contact area of diamond bearing surface 404 is continuous along the interface of diamond bearing surface 404 and opposing bearing surface 422. Both diamond bearing surface 404 and opposing bearing surface 422 are conical surfaces. Bearing assembly 490 is configured for shaft 420 to rotate about axis 409 within bearing 400.

While the conical bearings of FIGS. 4A-4D are shown and described as having continuous diamond bearing surfaces that are coupled with a shaft that has an opposing bearing surface of diamond reactive material, this arrangement can be reversed. For example, the shaft can have continuous diamond bearing surface and the conical bearings can have opposing bearing surface of diamond reactive material.

Angular Contact Bearing—Spherical Bearing

Figure 5B:
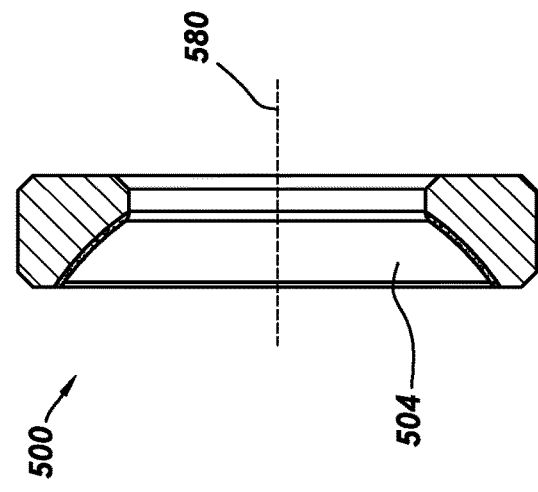
FIG. 5B is a cross-sectional view of the spherical bearing of FIG. 5A.
Figure 5D:
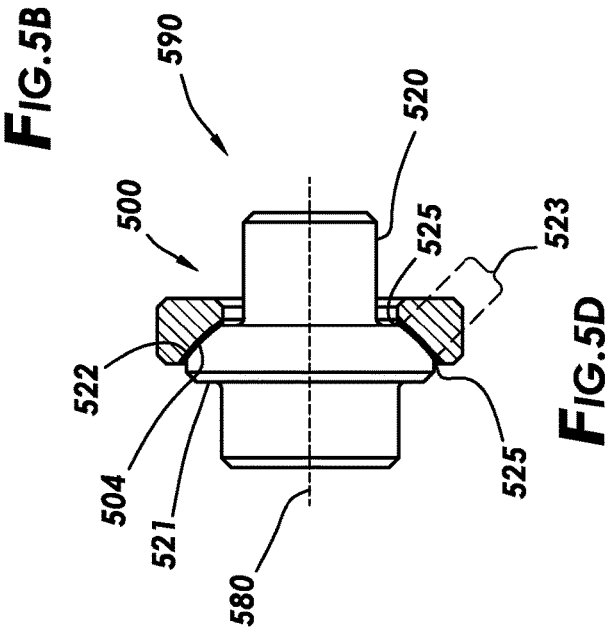
FIG. 5D is a cross-sectional view of the bearing assembly of FIG. 5C.
Figure 5A:
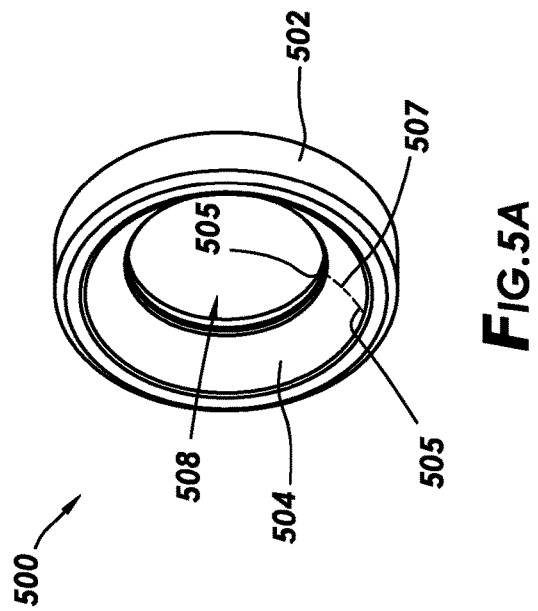
FIG. 5A is a perspective view of a spherical bearing.
Figure 5C:
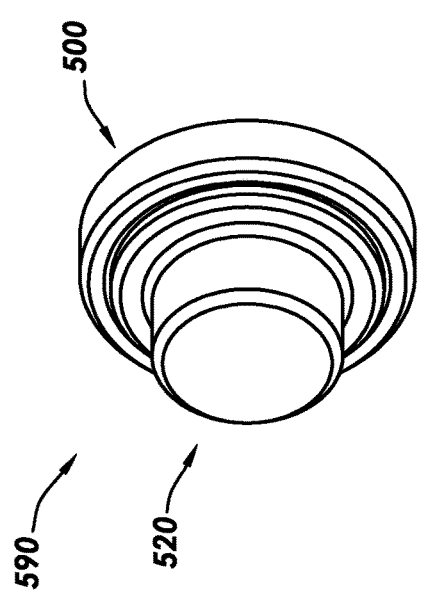
FIG. 5C is a perspective view of a bearing assembly including the spherical bearing of FIG. 5A engaged with a shaft.

Some embodiments of the present disclosure include an angular contact bearing, such as a spherical bearing assembly. In some such embodiments, the spherical bearing assembly includes a spherical bearing having a diamond bearing surface that is in sliding engagement with an opposing bearing surface. While described as a spherical bearing, the bearings disclosed herein are not limited to this shape, and may have other shapes, including other spheroidal or ellipsoidal shapes or other shapes having arcuate surfaces. In some embodiments, the bearing is a bearing with an elliptical surface, a conical surface, or another surface that defines a curve. With reference to FIGS. 5A-5D, one exemplary spherical bearing and bearing assembly is depicted. Spherical bearing 500 is substantially the same as conical bearing 400 shown in FIGS. 4A-4D, with the exception that diamond bearing surface 504 is a concave spherical surface as opposed to a flat conical surface as in FIGS. 4A-4D. That is, an imaginary line 507, extending between boundary edges 505 of diamond bearing surface 504 along the shortest path possible, with the provision that imaginary line 507 extends only along diamond bearing surface 504, defines an arcuate line rather than a straight line. Similarly, within bearing assembly 590 (as shown in FIGS. 5C and 5D), shaft 520 is substantially the same as shaft 420 shown in FIGS. 4C and 4D, with the exception that opposing bearing surface 522 is a convex spherical surface as opposed to a flat conical surface. The curvatures of diamond bearing surface 504 and opposing bearing surface 522 provide for a degree of misalignment compensation between shaft 520 and bearing 500 during operation of bearing assembly 590. That is, shaft 520 is not required to be in axial alignment with axis of rotation 580 while shaft 520 rotates relative to spherical bearing 500. Axis of rotation 580 is a theoretical axis passing through the center of cavity 508 and concentrically aligned with diamond bearing surface 504. Thus, the curvatures of diamond bearing surface 504 and opposing bearing surface 522 allow shaft 520 to rotate relative to spherical bearing 500 when shaft 520 is not concentric with spherical bearing 500, and when the actual axis of rotation of shaft 520 is at an angle relative to the theoretical axis of rotation 580. Spherical bearing 500 includes bearing housing 502. Shaft 520 includes bearing element 521 having opposing bearing surface 522 thereon. Opposing bearing surface 522 has a width 523, defined between the boundary edges 525 of opposing bearing surface 522. In the same manner as described with respect to FIGS. 1A-4D, opposing bearing surface 522 has a smaller width 523 than the width of the diamond bearing surface 504, such that opposing bearing surface 522 is engaged entirely within the boundary edges 505 of the diamond bearing surface 504.

While the spherical bearings of FIGS. 5A-5D are shown and described as having continuous diamond bearing surfaces that are coupled with a shaft that has an opposing bearing surface of diamond reactive material, this arrangement can be reversed. For example, the shaft can have continuous diamond bearing surface(s) and the spherical bearings can have opposing bearing surface(s) of diamond reactive material.

Angular Contact Bearing—Spherical Bearing with Articulation

Some embodiments of the present disclosure include an angular contact bearing that includes a spherical bearing that allows the opposing bearing element to which it is engaged to pivot and/or articulate relative to the spherical bearing. With reference to FIGS. 6A and 6B, one exemplary spherical bearing and bearing assembly is depicted. Spherical bearing assembly 690 includes shaft 620 engaged with spherical bearing 600. Spherical bearing 600 includes housing 602 and diamond bearing surface 604. Diamond bearing surface 604 has boundary edges 605 and width 607. Shaft 620 includes opposing bearing surface 622, having boundary edges 625 and width 623. Diamond bearing surface 604 is a curved, concave surface, and opposing bearing surface 622 is a curved, convex surface. As is evident from FIGS. 6A and 6B, shaft 620 is capable of an articulating and/or pivoting movement relative to spherical bearing 600, with the provision that the shaft 620 does not articulate sufficiently to cause the opposing bearing surface 622 to contact boundary edges 605 of the diamond bearing surface 604. That is, shaft 620 can tilt relative to spherical bearing 600, with opposing bearing surface 622 sliding along the diamond contact area of the diamond bearing surface 604 entirely within the boundary edges 605 thereof, while still maintaining shaft 620 engaged with spherical bearing 600. Spherical bearing 600 also includes debris clearance hole 611. In the same manner as described with respect to FIGS. 1A-5D, opposing bearing surface 622 has a smaller width 623 than the width 607 of the diamond bearing surface 604.

In some embodiments, the bearings assemblies disclosed herein include a hybrid bearing engagement surfaces. For example, the diamond bearing surface can be a conical or cylindrical bearing surface and the opposing bearing surface can be a spherical bearing surface (or vice versa).

While the spherical bearings of FIGS. 6A and 6B are shown and described as having continuous diamond bearing surfaces that are coupled with a shaft that has an opposing bearing surface of diamond reactive material, this arrangement can be reversed. For example, the shaft can have continuous diamond bearing surface(s) and the spherical bearings can have opposing bearing surface(s) of diamond reactive material.

Axial Bearing

Some embodiments of the present disclosure include an axial bearing assembly that includes an axial bearing having a diamond bearing surface that is engaged with an opposing bearing surface. With reference to FIGS. 7A and 7B, axial bearing assembly 790 includes axial bearing 700. Axial bearing 700 includes bearing housing 702. Diamond bearing surface 704 is on one end of bearing housing 702. Diamond bearing surface 704 has width 707 defined between boundary edges 705. Axial bearing assembly 790 includes shaft 720, including shaft body 724 and shaft end 726. Shaft 720 has opposing bearing surface 722 on a portion of shaft end 726. Opposing bearing surface 722 has width 723 defined between boundary edges 725. Axial bearing 700 is slidingly engaged with shaft 720, such that shaft body 724 is engaged within bearing cavity 708 and such that diamond bearing surface 704 is engaged with opposing bearing surface 722. In the same manner as described with respect to FIGS. 1A-6B, opposing bearing surface 722 has a smaller width 723 than the width 707 of the diamond bearing surface 704.

While the axial bearings of FIGS. 7A-7B are shown and described as having continuous diamond bearing surfaces that are coupled with a shaft that has an opposing bearing surface of diamond reactive material, this arrangement can be reversed. For example, the shaft can have continuous diamond bearing surface(s) and the axial bearings can have opposing bearing surface(s) of diamond reactive material.

Combined and Integral Axial and Radial Bearing

Some embodiments of the present disclosure include a combined axial and radial bearing assembly that includes a combined axial and radial bearing having diamond bearing surfaces that are engaged with opposing bearing surfaces. With reference to FIGS. 8A-8C, combined axial and radial bearing assembly 890 includes combined axial and radial bearing 800. Combined axial and radial bearing 800 includes bearing housing 802. Diamond bearing surface 804a is on one end of bearing housing 802. Diamond bearing surface 804b is along an interior surface of cavity 808 of bearing housing 802. As shown, diamond bearing surfaces 804a and 804b are a single, integral structure connected together at bend 899, such that diamond bearing surface 804a is on one side of bend 899 and diamond bearing surface 804b is on another side of bend 899. Axial bearing assembly 890 includes shaft 820, including shaft body 824 and shaft end 826. Shaft 820 has opposing bearing surface 822a on a portion of shaft end 826 and opposing bearing surface 822b as an outer surface of shaft body 824. Axial bearing 800 is slidingly engaged with shaft 820, such that shaft body 824 is engaged within bearing cavity 808, such that diamond bearing surface 804a is engaged with opposing bearing surface 822a and diamond bearing surface 804b is engaged with opposing bearing surface 822b. In the same manner as described with respect to FIGS. 1A-7B, opposing bearing surface 822a has a smaller width than the width of the diamond bearing surface 804a and opposing bearing surface 822b has a shorter width (or height) than the width (or height) of the diamond bearing surface 804b. Thus, opposing bearing surface 822a is engaged with diamond bearing surface 804a entirely within the boundary edges 805 of the structure that forms diamond bearing surfaces 804a and 804b, and opposing bearing surface 822b is engaged with diamond bearing surface 804b entirely within the boundary edges 805 of the structure that forms diamond bearing surfaces 804a and 804b. The bearing surfaces 804a and 822a bear axial loads (e.g., thrust loads), and the bearing surfaces 804b and 822b bear radial loads.

While the combined axial and radial bearings of FIGS. 8A-8C are shown and described as having continuous diamond bearing surfaces that are coupled with a shaft that has an opposing bearing surface of diamond reactive material, this arrangement can be reversed. For example, the shaft can have continuous diamond bearing surface(s) and the combined axial and radial bearings can have opposing bearing surface(s) of diamond reactive material.

Combined and Discrete Axial and Radial Bearing

In some embodiments of a combined axial and radial bearing assembly, rather than being integral, as is shown in FIGS. 8A-8C, the axial load bearing diamond bearing surface is a separate and discrete structure from the radial load bearing diamond bearing surface. With reference to FIGS. 9A-9E, combined axial and radial bearing assembly 990 includes combined axial and radial bearing 900. Combined axial and radial bearing 900 includes bearing housing 902. Bearing housing 902 includes radial bearing receptacle 905 and axial bearing receptacle 903. Combined axial and radial bearing 900 includes radial diamond element 907 having diamond bearing surface 904a, and axial diamond element 909 having diamond bearing surface 904b. To assemble combined axial and radial bearing 900, radial diamond element 907 is engaged within radial bearing receptacle 905 and axial diamond element 909 is engaged within axial bearing receptacle 903. Combined axial and radial bearing assembly 990 includes shaft 920, including shaft body 924 and shaft end 926. Shaft 920 has opposing bearing surface 922a on a portion of shaft end 926 and opposing bearing surface 922b as an outer surface of shaft body 924. Opposing bearing surface 922a has a width 921 defined between boundary edges 919 thereof. Opposing bearing surface 922b has a width 923 defined between boundary edges 925 thereof. Diamond bearing surface 904a has a width 913 defined between boundary edges 911 thereof. Diamond bearing surface 904b has a width 917 defined between boundary edges 915 thereof. Axial bearing 900 is slidingly engaged with shaft 920, such that shaft body 924 is engaged within bearing cavity 908, and such that diamond bearing surface 904a is engaged with opposing bearing surface 922a, and such that diamond bearing surface 904b is engaged with opposing bearing surface 922b. In the same manner as described with respect to FIGS. 1A-8C, opposing bearing surface 922a has a smaller width 921 than the width 913 of the diamond bearing surface 904a and opposing bearing surface 922b has a shorter width 923 (or height) than the width 917 (or height) of the diamond bearing surface 904b. The bearing surfaces 904a and 922a bear axial loads, and the bearing surfaces 904b and 922b bear radial loads.

While both diamond bearing surfaces 904a and 904b are shown as continuous bearing surfaces, in some embodiments one of the diamond bearing surfaces 904a and 904b is replaced with discrete diamond bearing elements rather than a single continuous diamond bearing surface. While the combined axial and radial bearings of FIGS. 9A-9E are shown and described as having continuous diamond bearing surfaces that are coupled with a shaft that has an opposing bearing surface of diamond reactive material, this arrangement can be reversed. For example, the shaft can have continuous diamond bearing surface(s) and the combined axial and radial bearings can have opposing bearing surface(s) of diamond reactive material.

Tilting Pad Bearings

In some embodiments, the concepts described herein are applied to tilting pad bearings. In some such embodiments, the tilting pads of the tilting pad bearings have the opposing bearing surfaces thereon, and the shaft (or other component) has the continuous diamond bearing surface thereon. In other such embodiments, the tilting pads of the tilting pad bearings have the diamond bearing surfaces thereon, and the shaft (or other component) has the opposing bearing surface thereon. The tilting pads can articulate to engage or disengage from the shaft. When the tilting pads are engaged with the shaft, the opposing bearing surfaces on the tilting pads are in contact with the diamond contact area of the diamond bearing surface on the shaft. In such embodiments, the opposing bearing surfaces contact the diamond contact area entirely within the boundary edges of the diamond bearing surface. Such tilting pad bearings may be used to bear radial and/or axial loads. Some examples of tilting bearing pads are disclosed in U.S. Patent Publication No. 2020/0325933.

Bearing Characteristics

Figure 10:
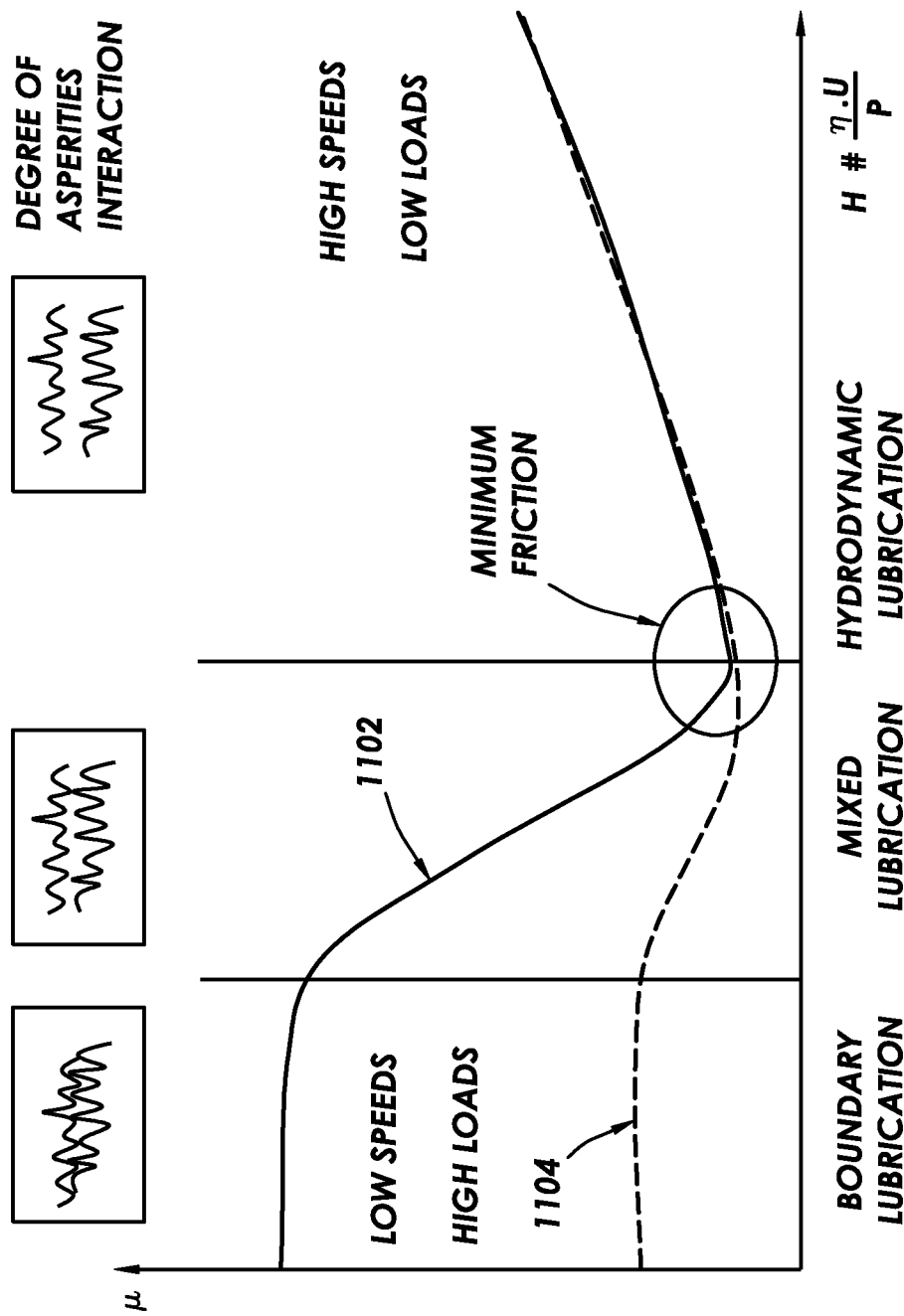
FIG. 10 is a Stribeck Curve comparing a conventional sliding bearing system with an exemplary sliding bearing system in accordance with the present disclosure.

FIG. 10 is a graph showing a Stribeck curve plotting the Hersey number on the horizontal axis and the friction coefficient on the vertical axis. In the graph of FIG. 10, a curve for a conventional sliding bearing system, curve 1102 is plotted, as well as a curve for a system in accordance with the present disclosure using a diamond bearing surface engaged with a diamond reactive material (steel), curve 1104. The bearing assemblies disclosed herein provide for a low sliding contact friction that, in turn, provides for low wear on the bearing assembly. When conditions are not conducive to the formation of a fluid film between the diamond and opposing bearing surfaces, the bearing assembly disclosed herein is still capable of exhibiting a low contact friction. Conditions that are not conducive to the formation of a fluid film between the diamond and opposing bearing surfaces include, but are not limited to, start-up, shut-down, vibration in the bearing assembly, shock loads, geometric changes affecting bearing clearances, or other transient events. The bearing assemblies according to the present disclosure provide for low friction during boundary lubrication conditions. In some embodiments, the bearing assemblies according to the present disclosure may provide less friction than exists in certain hydrodynamic lubrication regimes.

In some embodiments, the coefficient of friction (CoF) exhibited by the engagement between the diamond bearing surfaces and the opposing bearing surfaces disclosed herein is less than 0.1, 0.09 or less, 0.08 or less, 0.07 or less, 0.06 or less, 0.05 or less, 0.04 or less, 0.03 or less, 0.02 or less, or 0.01 or less. In some embodiments, the CoF exhibited by the engagement between the diamond bearing surfaces and the opposing bearing surfaces disclosed herein ranges from 0.01 to 0.09, or 0.01 to 0.07, or 0.01 to 0.05, or 0.01 to 0.03, or any range or value therebetween.

The continuous surface of the diamond bearing surface, along the diamond contact area, provides for the avoidance of the opposing bearing surface contacting a diamond edge or diamond point, which facilitates bearing surface integrity, such as by avoiding gouging of the opposing bearing surface by the diamond. Without being bound by theory, it is believed that continuous diamond bearing surfaces impart less stress on the bearing surfaces of the bearing assembly, at least in part due to the avoidance of diamond edge contact, in comparison to an otherwise identical bearing assembly where the diamond bearing surface is formed of multiple discreet bearing elements. Without being bound by theory, it is also believed that the continuous diamond bearing surfaces disclosed herein are more conducive to the development of a fluid film between the bearing surfaces, in comparison to an otherwise identical bearing assembly where the diamond bearing surface is formed of multiple discreet bearing elements.

Methods of Making the Diamond Bearing Surfaces

In some embodiments, the diamond bearing surfaces disclosed herein are made by a high-pressure and high-temperature process (HPHT diamonds). In some embodiments, the diamond bearing surfaces disclosed herein are made by chemical vapor deposition (CVD) or physical vapor deposition (PVD). The thickness of the diamond layer that has the diamond bearing surface may be 0.200" or less, or 0.150" or less, or 0.100" or less, or 0.09" or less, or 0.08" or less, or 0.07" or less, or 0.06" or less, or 0.05" or less, or 0.04" or less, or 0.03" or less, or 0.02" or less, 0.010" or less. The thickness of the diamond layer that has the diamond bearing surface may be from 0.010" to 0.200", from 0.02" to 0.150", from 0.03" to 0.100", from 0.04" to 0.09", from 0.05" to 0.08", from 0.06" to 0.07", or any range or value therebetween. For example, when the diamond layer is made via CVD or PVD, the thickness of the diamond layer that has the diamond bearing surface may be 0.010" or less, and when the diamond layer is made by a high-pressure and high-temperature process the thickness of the diamond layer that has the diamond bearing surface may be 0.200" or less. In some embodiments, the diamond is leached, un-leached, or leached and backfilled. As an example, to make a diamond layer using the CVD process, seed diamond particles are attached to a substrate and then placed in a chamber under conditions sufficient to promote the crystalline growth of the seed diamond particles.

Applications

While the bearing assemblies disclosed herein are not limited to particular applications, some exemplary applications include journal bearings for an airplane propeller, bearings in a planetary gear box, marine bearings, turbo bearings, gas or steam turbine main shaft bearings, downhole pump bearings (such as an electronic submersible pump), bearings in downhole motors, driveline bearings, and roller ball bearings.

While described as applied to particular bearing geometries, the concepts described in the present disclosure are not limited to being applied to these specific bearing geometries. The concepts described in the present disclosure may be applied to axial bearings, radial bearings, combined axial and radial bearings, roller ball bearings, cam followers, linear bearings, power transmission surfaces (e.g., gears and drivelines), rod guides, pipe protectors, valves, and other assemblies or machines that have moving parts with surfaces that are in sliding engagement with one another. The concepts described in the present disclosure may be applied to assemblies or machines that include two load-transmitting bearing surfaces that are slidingly engaged with one another, in which one of the load-transmitting bearing surfaces is a diamond surface and the other of the load-transmitting bearing surfaces is a metal alloy surface that contains more than 2 wt. % of a diamond solvent-catalyst. In some such embodiments, the slidingly engaged contact area between the two load-transmitting bearing surfaces is contained within a continuous diamond bearing surface that is defined by the boundary edges of the diamond bearing surface. In some such embodiments, the boundary edges of the metal alloy surface contact the diamond surface.

In some embodiments, the bearing assemblies disclosed herein include hybrid bearing bearing surfaces that have different geometries and surface profiles. For example, the diamond bearing can have a first geometric shape with a first surface profile (e.g., a conical or cylindrical bearing surface) and the opposing component can have a second geometric shape with a second surface profile (e.g., a spherical bearing surface). For example, an axial bearing can include a diamond bearing surface that is planar and an opposing bearing surface that is non-planar (or vice versa).

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A bearing assembly, the bearing assembly comprising:
a bearing, the bearing comprising a bearing body having a first bearing surface;
a part, the part comprising a body having a second bearing surface;
wherein one of the first and second bearing surfaces is a polycrystalline diamond bearing surface, and wherein the other of the first and second bearing surfaces is a metal bearing surface comprising a metal, the metal containing at least 2 weight percent of a diamond solvent-catalyst based on a total weight of the metal;
wherein the bearing is coupled with the part such that a metal contact area of the metal bearing surface is engaged with a diamond contact area of the polycrystalline diamond bearing surface, and wherein the polycrystalline diamond bearing surface is a continuous surface along an entirety of the diamond contact area.

2. The bearing assembly of claim 1, wherein the bearing and the part are positioned relative to one another such that the metal bearing surface slides along the diamond contact area without contacting any boundary edges of the polycrystalline diamond bearing surface.

3. The bearing assembly of claim 1, wherein the metal contact area is an entirety of the metal bearing surface.

4. The bearing assembly of claim 1, wherein an entirety of the metal bearing surface is engaged with less than an entirety of the polycrystalline diamond bearing surface.

5. The bearing assembly of claim 1, wherein the diamond contact area defines a path along which the metal contact area contacts the polycrystalline diamond bearing surface, and wherein the metal bearing surface slides along the path without contacting any boundary edges of the polycrystalline diamond bearing surface.

6. The bearing assembly of claim 1, wherein the part comprises a shaft, and wherein the second bearing surface is an outer surface of the shaft.

7. The bearing assembly of claim 6, wherein the bearing assembly is a radial journal bearing assembly, the bearing body comprising a bearing ring having an internal surface and a cavity, wherein the polycrystalline diamond bearing surface is the internal surface of the bearing ring, wherein the shaft is positioned within the cavity, and wherein the metal bearing surface is an outer surface of the shaft or is coupled with the shaft.

8. The bearing assembly of claim 7, wherein the bearing ring comprises a plurality of discrete polycrystalline diamond bearing surfaces on the internal surface of the bearing ring, wherein the shaft comprises a plurality of discrete metal bearing surfaces, and wherein each discrete metal bearing surface is engaged with one of the discrete polycrystalline diamond bearing surfaces, and wherein each discrete polycrystalline diamond bearing surface is a continuous surface along an entirety of a diamond contact area for that discrete polycrystalline diamond bearing surface.

9. The bearing assembly of claim 6, wherein the bearing assembly is a conical bearing assembly, the bearing body comprising a bearing ring having a conical surface and a cavity, wherein the polycrystalline diamond bearing surface is the conical surface of the bearing ring, wherein the metal bearing surface is an outer surface of the shaft, and wherein the shaft is positioned within the cavity such that the metal bearing surface of the shaft is engaged with the conical surface.

10. The bearing assembly of claim 6, wherein the bearing assembly is a spherical bearing assembly, the bearing body comprising a bearing ring having a spherical surface and a cavity, wherein the polycrystalline diamond bearing surface is the spherical surface of the bearing ring, wherein the metal bearing surface is an outer surface of the shaft, and wherein the shaft is positioned within the cavity such that the metal bearing surface of the shaft is engaged with the spherical surface.

11. The bearing assembly of claim 10, wherein the shaft is pivotable relative to the bearing.

12. The bearing assembly of claim 6, wherein the bearing is a radial bearing, an axial bearing, or a combined axial and radial bearing.

13. The bearing assembly of claim 12, wherein the bearing is the combined axial and radial bearing and comprises a bearing ring having a cavity, wherein the polycrystalline diamond bearing surface is a first polycrystalline diamond bearing surface on an end of the bearing ring, the bearing ring further comprising a second polycrystalline diamond bearing surface on an internal surface of the bearing ring, wherein the shaft comprises a collar on an end of the shaft, wherein the metal bearing surface is a first metal bearing surface of the collar, the shaft further comprising a second metal bearing surface that is an outer surface of the shaft, and wherein the shaft is engaged within the cavity such that the first metal bearing surface is engaged with the first polycrystalline diamond bearing surface and the second metal bearing surface is engaged with the second polycrystalline diamond bearing surface.

14. The bearing assembly of claim 13, wherein the bearing ring comprises a radial bearing receptacle and an axial bearing receptacle, wherein a radial polycrystalline diamond element is positioned within the radial bearing receptacle and comprises the second polycrystalline diamond bearing surface, and wherein an axial polycrystalline diamond element is positioned within the axial bearing receptacle and comprises the first polycrystalline diamond bearing surface.

15. The bearing assembly of claim 1, wherein the first bearing surface is the polycrystalline diamond bearing surface, and wherein the second bearing surface is the metal bearing surface.

16. The bearing assembly of claim 1, wherein the polycrystalline diamond bearing surface is bound by boundary edges of the polycrystalline diamond bearing surface, and wherein the metal bearing surface is engaged with the polycrystalline diamond bearing surface entirely within the boundary edges.

17. The bearing assembly of claim 1, wherein the polycrystalline diamond bearing surface has a first surface area, wherein the diamond contact area has a second surface area that is less than the first surface area, and wherein the diamond contact area is a discrete portion of the first surface area of the polycrystalline diamond bearing surface.

18. The bearing assembly of claim 17, wherein the metal bearing surface has a third surface area, and wherein the third surface area is less than the first surface area.

19. The bearing assembly of claim 1, wherein the polycrystalline diamond bearing surface is a surface of a polycrystalline diamond layer, the polycrystalline diamond layer having a thickness of 0.200" or less.

20. The bearing assembly of claim 1, wherein the metal comprises from 55 to 100 wt. % of the diamond solvent-catalyst based on the total weight of the metal.

21. The bearing assembly of claim 1, wherein the metal is softer than a superhard material.

22. The bearing assembly of claim 1, wherein the metal is softer than tungsten carbide (WC).

23. The bearing assembly of claim 1, wherein the metal has a hardness value of less than 25 GPa as determined in accordance with ASTM E92-17.

24. The bearing assembly of claim 1, wherein a coefficient of friction between the polycrystalline diamond bearing surface and the metal bearing surface is 0.09 or less.

25. The bearing assembly of claim 1, wherein the metal is steel.

26. The bearing assembly of claim 1, wherein the polycrystalline diamond bearing surface has a surface finish of 20 μin Ra or less.

27. The bearing assembly of claim 1, wherein the diamond solvent-catalyst comprises iron, cobalt, nickel, titanium, or copper.

28. The bearing assembly of claim 1, wherein the diamond solvent-catalyst comprises ruthenium, rhodium, palladium, chromium, manganese, or tantalum.

29. A bearing assembly, the bearing assembly comprising:
a bearing, the bearing comprising a bearing body and a first bearing surface on the bearing body;
a part, the part comprising a body and a second bearing surface on the body;
wherein one of the first and second bearing surfaces is a polycrystalline diamond bearing surface, and wherein the other of the first and second bearing surfaces is a metal bearing surface comprising a metal, the metal containing at least 2 weight percent of iron, cobalt, nickel, titanium, copper, ruthenium, rhodium, palladium, chromium, manganese, or tantalum based on a total weight of the metal;
wherein the bearing is coupled with the part such that a metal contact area of the metal bearing surface is engaged with a diamond contact area of the polycrystalline diamond bearing surface, and wherein the polycrystalline diamond bearing surface is a continuous surface along an entirety of the diamond contact area.

30. The bearing assembly of claim 29, wherein the polycrystalline diamond bearing surface has a surface finish of 20 μin Ra or less.

31. A method of making and using a bearing assembly, the method comprising:
providing a bearing, the bearing comprising a bearing body and a first bearing surface on the bearing body;
providing a shaft, the shaft comprising a shaft body and a second bearing surface on the shaft body;
wherein one of the first and second bearing surfaces is a polycrystalline diamond bearing surface, and wherein the other of the first and second bearing surfaces is a metal bearing surface comprising a metal, the metal containing at least 2 weight percent of a diamond solvent-catalyst based on a total weight of the metal;
lapping the polycrystalline diamond bearing surface, polishing the polycrystalline diamond bearing surface, or combinations thereof;
coupling the shaft with the bearing such that a metal contact area of the metal bearing surface is engaged with a diamond contact area of the polycrystalline diamond bearing surface;
wherein the polycrystalline diamond bearing surface is a continuous surface along an entirety of the diamond contact area, and wherein the metal contact area is engaged with the polycrystalline diamond bearing surface entirely within boundary edges of the polycrystalline diamond bearing surface; and
moving the shaft and bearing relative to one another such that the metal contact area surface slides along a path along the diamond contact area.

32. The method of claim 31, wherein the polycrystalline diamond bearing surface is lapped, polished, or combinations thereof until the polycrystalline diamond bearing surface has a surface finish of 20 μin Ra or less.

* * * * *